United States Patent
Takahashi et al.

(10) Patent No.: US 10,767,249 B2
(45) Date of Patent: Sep. 8, 2020

(54) MAGNETIC POWDER AND PRODUCTION METHOD THEREOF, MAGNETIC CORE AND PRODUCTION METHOD THEREOF, COIL COMPONENT AND MOTOR

(71) Applicants: Murata Manufacturing Co., Ltd., Kyoto (JP); Tohoku Magnet Institute Co., Ltd., Sendai, Miyagi (JP)

(72) Inventors: Toru Takahashi, Nagaokakyo (JP); Kazuhiro Henmi, Nagaokakyo (JP); Akihiro Makino, Sendai (JP); Noriharu Yodoshi, Sendai (JP)

(73) Assignees: Murata Manufacturing Co., Ltd., Kyoto (JP); Tohoku Magnet Institute Co., Ltd., Sendai (JP)

( * ) Notice: Subject to any disclaimer, the term of this patent is extended or adjusted under 35 U.S.C. 154(b) by 299 days.

(21) Appl. No.: 15/661,520

(22) Filed: Jul. 27, 2017

(65) Prior Publication Data

US 2017/0321308 A1 Nov. 9, 2017

Related U.S. Application Data

(63) Continuation of application No. PCT/JP2016/052721, filed on Jan. 29, 2016.

(30) Foreign Application Priority Data

Jan. 30, 2015 (JP) .................. 2015-017058
Jan. 30, 2015 (JP) .................. 2015-017060

(51) Int. Cl.
*C22C 38/02* (2006.01)
*C22C 45/02* (2006.01)
(Continued)

(52) U.S. Cl.
CPC ............ *C22C 38/02* (2013.01); *B22F 1/00* (2013.01); *B22F 3/00* (2013.01); *B22F 3/02* (2013.01);
(Continued)

(58) Field of Classification Search
None
See application file for complete search history.

(56) References Cited

U.S. PATENT DOCUMENTS

2005/0236071 A1* 10/2005 Koshiba ............. H01F 1/15308
148/304
2009/0039724 A1* 2/2009 Wilson ................. H02K 49/106
310/154.33
(Continued)

FOREIGN PATENT DOCUMENTS

JP H04-078114 A 3/1992
JP H04-314803 A 11/1992
(Continued)

OTHER PUBLICATIONS

International Search Report issued in PCT/JP2016/052721; dated Apr. 12, 2016.
(Continued)

*Primary Examiner* — George Wyszomierski
(74) *Attorney, Agent, or Firm* — Studebaker & Brackett PC

(57) ABSTRACT

A magnetic powder is represented by general formula $Fe_a(Si_bB_cP_d)_{100-a}$, and is produced with a gas atomization method. When the value of a and the value of b in the general formula is represented (a, b), (a, b) is within a predetermined region V1. Similarly, (a, c) and (a, d) are within a predetermined region, respectively. Whereby, it is possible to obtain an alloy magnetic powder which has high saturation magnetic flux density, low magnetic loss, and is spherical and (Continued)

easy to handle; and a magnetic core, a variety of coil components, and a motor can be realized by using the magnetic material.

17 Claims, 13 Drawing Sheets

(51) Int. Cl.
| | |
|---|---|
| H02K 1/02 | (2006.01) |
| B22F 9/08 | (2006.01) |
| B22F 1/00 | (2006.01) |
| H01F 1/22 | (2006.01) |
| C22C 38/00 | (2006.01) |
| H01F 1/153 | (2006.01) |
| B22F 3/00 | (2006.01) |
| B22F 3/02 | (2006.01) |
| B22F 3/24 | (2006.01) |
| H01F 3/08 | (2006.01) |
| H01F 41/02 | (2006.01) |

(52) U.S. Cl.
CPC ............... *B22F 3/24* (2013.01); *B22F 9/08* (2013.01); *B22F 9/082* (2013.01); *C22C 38/00* (2013.01); *C22C 38/002* (2013.01); *C22C 45/02* (2013.01); *H01F 1/153* (2013.01); *H01F 1/22* (2013.01); *H01F 3/08* (2013.01); *H01F 41/0246* (2013.01); *H02K 1/02* (2013.01); *B22F 2003/248* (2013.01); *B22F 2009/0824* (2013.01); *B22F 2009/0848* (2013.01); *B22F 2301/35* (2013.01); *C22C 2200/02* (2013.01); *C22C 2202/02* (2013.01)

(56) References Cited

U.S. PATENT DOCUMENTS

| | | | | |
|---|---|---|---|---|
| 2010/0043927 | A1* | 2/2010 | Makino | C22C 45/02 |
| | | | | 148/612 |
| 2015/0115766 | A1* | 4/2015 | Taguchi | B22F 1/02 |
| | | | | 310/216.001 |
| 2017/0320138 | A1* | 11/2017 | Takahashi | B22F 1/00 |
| 2018/0108465 | A1* | 4/2018 | Takahashi | C22C 38/00 |

FOREIGN PATENT DOCUMENTS

| | | |
|---|---|---|
| JP | 2001-297766 A | 10/2001 |
| JP | 2002-060914 A | 2/2002 |
| JP | 2003-059710 A | 2/2003 |
| JP | 2004-018889 A | 1/2004 |
| JP | 2004-063798 A | 2/2004 |
| JP | 2005-294461 A | 10/2005 |
| JP | 2005-307291 A | 11/2005 |
| JP | 2008-109080 A | 5/2008 |
| JP | 2009-108415 A | 5/2009 |
| JP | 2010-010668 A | 1/2010 |
| JP | 2015-175041 A | 10/2015 |
| WO | 2009/037824 A1 | 3/2009 |
| WO | 2010/084900 A1 | 7/2010 |
| WO | 2012/147559 A1 | 11/2012 |
| WO | 2014/136587 A1 | 9/2014 |

OTHER PUBLICATIONS

Written Opinion issued in PCT/JP2016/052721; dated Apr. 12, 2016.

* cited by examiner

MAGNETIC POWDER AND PRODUCTION METHOD THEREOF, MAGNETIC CORE AND PRODUCTION METHOD THEREOF, COIL COMPONENT AND MOTOR

CROSS REFERENCE TO RELATED APPLICATIONS

This application is a continuation application of international patent application Serial No. PCT/JP2016/052721 filed Jan. 29, 2016, which published as PCT Publication No. WO2016/121950 on Aug. 4, 2016, which claims benefit of Japan patent application Nos. 2015-017058 filed Jan. 30, 2015, and 2015-017060 filed Jan. 30, 2015, the entire content of which are incorporated herein by reference.

TECHNICAL FIELD

The present disclosure relates to a magnetic powder and a production method thereof, a magnetic core and a production method thereof, a coil component and a motor, and more particularly to an alloy-based magnetic powder suitable for coil components such as a transformer and an inductor and a production method thereof, a magnetic core using the magnetic powder and a production method thereof, a variety of coil components using the magnetic powder such as a reactor and an inductor, and a motor.

BACKGROUND

In coil components used for a power inductor, a transformer or the like, a stator core and a rotor core equipped in a motor, magnetic powders using metallic magnetics are widely used.

Particularly, amorphous alloys of these magnetic powders have been, conventionally, researched and developed actively because it has excellent soft magnetic characteristics.

For example, World Intellectual Property Organization Publication No. 2009/037824 proposes a soft magnetic amorphous alloy represented by a compositional formula $\{Fe_a(Si_xB_yP_z)_{1-a}\}_{100-b}L_b$ in which among constituent elements of the compositional formula, L is one or more kinds of elements selected from the group of Al, Cr, Zr, Nb, Mo, Hf, Ta and W, and a, b, x, y and z satisfy $0.7 \le a \le 0.82$, $0 < b \le 5$ at %, $0.05 \le x \le 0.6$, $0.1 \le y \le 0.85$, $0.05 \le z \le 0.7$, and $x+y+z=1$.

In World Intellectual Property Organization Publication No. 2009/037824, predetermined amounts of Fe, Si, B, Fe$_3$P, and specific elements L such as Al, Cr are weighed, and the resulting mixture was melted by performing high frequency induction heating in an argon atmosphere to prepare a master alloy, and then the master alloy is treated with a single roll liquid quenching method or a water atomization method, and thereby, a continuous ribbon-like amorphous alloy or a soft magnetic powder has been obtained.

Further, World Intellectual Property Organization Publication No. 2009/037824 also describes an example in which the above-mentioned master alloy is treated with a die casting method to obtain a cast rod material.

That is, World Intellectual Property Organization Publication No. 2009/037824 attempts to obtain a soft magnetic amorphous alloy which is high in the ability of amorphous material formation and soft magnetic characteristics, and has high saturation magnetic flux density and high corrosion resistance by adding and specifying the above-mentioned composition ranges of a specific element L such as Al or Cr to a Fe—Si—B—P-based alloy.

Japanese Unexamined Patent Application Publication No. 2009-108415 proposes an amorphous alloy composition represented by a general formula $Fe_aB_bSi_cP_xCu_y$, in which $73 \le a \le 85$ at %, $9.65 \le b \le 22$ at %, $9.65 \le b+c \le 24.75$ at %, $0.25 \le x \le 5$ at %, $0 \le y \le 0.35$ at %, and $0 \le y/x \le 0.5$ and having a ribbon-shape having a thickness of 30 µm or more and 300 µm or less.

Also in Japanese Unexamined Patent Application Publication No. 2009-108415, the master alloy is treated with a single roll liquid quenching method or a die casting method to obtain a continuous ribbon or a cast rod material as with World Intellectual Property Organization Publication No. 2009/037824.

Further, Japanese Unexamined Patent Application Publication No. 2009-108415 also describes an example in which the above-mentioned master alloy is treated with a double roll liquid quenching method to prepare a plate-like material.

That is, Japanese Unexamined Patent Application Publication No. 2009-108415 attempts to obtain a rod-like or plate-like amorphous alloy composition, which has high ability of amorphous material formation and high saturation magnetic flux density and can be highly thickened, by adding P or Cu to a Fe—Si—B-based alloy, and limiting composition as described above.

SUMMARY

Technical Problem

However, in World Intellectual Property Organization Publication No. 2009/037824, although the corrosion resistance can be improved by adding the specific element L to the Fe—Si—B—P-based alloy, the saturation magnetic flux density tends to be lowered as an addition amount of the specific element L increases, and therefore it is difficult to stably attain desired good saturation magnetic flux density.

In World Intellectual Property Organization Publication No. 2009/037824, since the magnetic powder is prepared by the single roll liquid quenching method or the water atomization method, there are problems described below.

That is, in the single roll liquid quenching method, while the molten metal is sprayed to a disc-shaped roll which rotates at high speed and rapidly solidifies the molten metal to obtain a continuous ribbon, it is not easy to pulverize the continuous ribbon into a powder, and it is difficult to efficiently produce a magnetic powder from the continuous ribbon.

In the water atomization method, since water is sprayed to the molten metal, an amount of oxygen is large, and therefore impurities tend to be mixed in the powder, and it is difficult to obtain a magnetic powder of high purity. Moreover, in general, the powder produced by the water atomization method does not become spherical and has an irregular shape, and therefore it is difficult to obtain a magnetic powder of high quality.

Further, the die casting method is not suitable for the production method of the magnetic powder.

Thus, in World Intellectual Property Organization Publication No. 2009/037824, a magnetic powder of high quality cannot be obtained with high efficiency, and therefore, it is thought to be a difficulty to obtain a magnetic core and coil components or the like having desired magnetic characteristics.

On the other hand, Japanese Unexamined Patent Application Publication No. 2009-108415 discloses an alloy composition suitable for a continuous ribbon or bulk materials such as a rod-like member, a plate-like member and a small complex-shape member, and does not disclose an alloy composition of a magnetic powder. That is, since the magnetic material varies in cooling rate with preparation methods, a composition range of the magnetic material is thought to vary with the cooling rate. Accordingly, even if the composition range found for the continuous ribbon or for the bulk material is applied to a magnetic powder, it is thought to be a difficulty to attain desired magnetic characteristics.

Furthermore, since Japanese Unexamined Patent Application Publication No. 2009-108415 prepares alloys using the single roll liquid quenching method or the die casting method as with World Intellectual Property Organization Publication No. 2009/037824, it includes the same problems as in World Intellectual Property Organization Publication No. 2009/037824, and the double roll liquid quenching method has the same problems as in the single roll liquid quenching method.

The present disclosure has been made in view of such a situation, and it is an object of the present disclosure to provide an alloy-based magnetic powder which has high saturation magnetic flux density, low magnetic loss, and is spherical and easy to handle and a production method of the magnetic powder, a magnetic core using the magnetic powder and a production method of the magnetic core, a variety of coil components using the magnetic powder and a motor using the magnetic powder.

Solution to Problem

Although the gas atomization method has a low cooling rate comparison with the single roll liquid quenching method and the water atomization method, it has less restriction of a production process as distinct from the single roll liquid quenching method and does not use water as a jet fluid as distinct from the water atomization method, and therefore it is thought that a magnetic powder of high quality which is spherical and easy to handle can be obtained.

Thereupon, the present inventors have made studies about a Fe—Si—B—P-based alloy using the gas atomization method, and consequently have found that when an atomic composition ratio of alloy composition is within a predetermined range, it is possible to obtain a magnetic powder of high quality which has high saturation magnetic flux density, low magnetic loss, and is spherical and easy to handle even though an amorphous phase and a crystalline phase are mixed.

The present disclosure has been made based on such findings, and a magnetic powder according to the present disclosure is characterized in that a principal component is represented by a general formula $Fe_a(Si_bB_cP_d)_{100-a}$, and is produced with a gas atomization method, wherein when representing as (a, b) the a and the b, (a, b) is within a region surrounded by A1 (71.0, 0.19), B1 (79.6, 0), C1 (80.0, 0), D1 (81.0, 0.17), E1 (81.0, 0.44), F1 (79.6, 0.78) and G1 (71.0, 0.38), and when representing as (a, c) the a and the c, (a, c) is within a region surrounded by A2 (71.0, 0.48), B2 (78.1, 0), C2 (79.6, 0), D2 (81.0, 0.18), E2 (81.0, 0.26), F2 (79.1, 0.75) and G2 (71.0, 0.72), and when representing as (a, d) the a and the d, (a, d) is within a region surrounded by A3 (71.0, 0.08), B3 (71.9, 0), C3 (79.1, 0), D3 (81.0, 0.36), E3 (81.0, 0.62), F3 (77.2, 0.67) and G3 (71.0, 0.23).

In the magnetic powder of the present disclosure, it is also preferred that a portion of the Fe is substituted with any one of Co and Ni within a range of not more than 12 at %.

Thereby, it becomes possible to obtain a magnetic powder which has high saturation magnetic flux density and low magnetic loss, and has good soft magnetic characteristics that has a ferromagnetic property and a small hysteresis.

In the magnetic powder of the present disclosure, it is also preferred that a portion of the B (boron) is substituted with C (carbon) within a range of not more than 85 at %.

This also enables to improve the ability of amorphous formation, and furthermore, since C has the act of lowering a melting point, it becomes possible to obtain a magnetic powder capable of low-temperature synthesis which has desired high saturation magnetic flux density and low magnetic loss.

The magnetic powder of the present disclosure is preferred that the crystallinity measured by an X-ray diffraction method is at least 0% and not more than 30%.

Thereby, it is possible to obtain the magnetic powder of high quality having high saturation magnetic flux density and low magnetic loss which are not inferior to the case in which the powder structure is formed of only the amorphous phase, even though the crystalline phase, such as an α-Fe phase (ferrite phase) having a body-centered cubic crystal structure or the compound phase, is contained in the magnetic powder.

The magnetic powder of the present disclosure can be ensured as specifically having a saturation magnetic flux density of not less than 1.30 T.

Further, a method for producing a magnetic powder according to the present disclosure is characterized by comprising a mixing step of mixing at least simple elements of Fe, Si, B and P or compounds containing these elements so that a principal component satisfies a general formula $Fe_a(Si_bB_cP_d)_{100-a}$; a heating step of heating a mixture obtained by the mixing to prepare a molten metal; and a spraying step of spraying the inert gas to the molten metal to pulverize the molten metal, wherein in the mixing step, the single elements or the compounds are mixed so that (a, b) satisfies a region surrounded by A1 (71.0, 0.19), B1 (79.6, 0), C1 (80.0, 0), D1 (81.0, 0.17), E1 (81.0, 0.44), F1 (79.6, 0.78) and G1 (71.0, 0.38) when representing as (a, b) the a and the b, (a, c) satisfies a region surrounded by A2 (71.0, 0.48), B2 (78.1, 0), C2 (79.6, 0), D2 (81.0, 0.18), E2 (81.0, 0.26), F2 (79.1, 0.75) and G2 (71.0, 0.72) when representing as (a, c) the a and the c, and (a, d) satisfies a region surrounded by A3 (71.0, 0.08), B3 (71.9, 0), C3 (79.1, 0), D3 (81.0, 0.36), E3 (81.0, 0.62), F3 (77.2, 0.67) and G3 (71.0, 0.23) when representing as (a, d) the a and the d.

As described above, by preparing the magnetic powder with the gas atomization method, it is possible to obtain with high efficiency the spherical magnetic powder of high quality which has high saturation magnetic flux density and low magnetic loss.

In the method for producing the magnetic powder of the present disclosure, the spraying step is preferably performed in an atmosphere of a mixed gas formed by adding a hydrogen gas to the inert gas.

Thereby, mixing of oxygen in the magnetic powder can be more effectively avoided, and therefore mixing of impurities resulting from oxygen can be avoided as much as possible.

Furthermore, in the method for producing the magnetic powder of the present disclosure, the inert gas is preferably one of an argon gas and a nitrogen gas which is relatively low-cost and easily available.

In the method for producing the magnetic powder of the present disclosure, the heating step and the spraying step are preferably performed in an inert gas atmosphere, and more preferably performed in a mixed gas atmosphere formed by adding hydrogen gas to the inert gas.

Also in this case, the inert gas is preferably one of an argon gas or a nitrogen gas which is relatively low-cost and easily available.

In the method for producing the magnetic powder of the present disclosure, a content ratio of the hydrogen gas in the mixed gas is preferably 0.5 to 7% in terms of partial pressure.

Further, a magnetic core according to the present disclosure is characterized in that the principal component is formed of the magnetic powder described in any one of the above.

The magnetic core of the present disclosure is preferred that it contains a binder, and the content of the magnetic powder is 60 vol % or more in terms of volume ratio.

A method for producing a magnetic core according to the present disclosure is characterized by including a forming step of mixing the magnetic powder prepared by the production method described in any one of the above with a binder and forming the resulting mixture to prepare a compact, and a heat treatment step of heat treating the compact.

Further, a coil component according to the present disclosure is characterized in that a coil conductor is wound around a core part, wherein the core part is formed of the above-magnetic core.

Furthermore, the coil component according to the present disclosure is characterized in that a coil conductor is buried in a magnetic part, wherein a principal component of the magnetic part is formed of the above-magnetic powder.

In the coil component of the present disclosure, it is also preferred that the magnetic part contains a binder, and the content of the magnetic powder in the magnetic part is not less than 60 vol % in terms of volume ratio.

Thereby, it is possible to easily obtain a coil component which has good magnetic characteristics without lowering magnetic permeability or the saturation magnetic flux density.

A motor according to the present disclosure is characterized by comprising a stator core in which a plurality of armature teeth are spaced at regular intervals on the same circumference, a coil conductor wound around the armature teeth, and a rotor core arranged rotatably inside the stator core, wherein the principal component of at least any one of the stator core and the rotor core is formed of the magnetic powder described in any one of the above.

Advantageous Effects of the Disclosure

According to the magnetic powder of the present disclosure, since the magnetic powder has a principal component represented by the general formula $Fe_a(Si_bB_cP_d)_{100-a}$, and is produced with the gas atomization method, and (a, b), (a, c) and (a, d) are within the predetermined range described above, it is possible to obtain a magnetic powder of high quality which has high saturation magnetic flux density, low magnetic loss, and is spherical and easy to handle even though an amorphous phase and a crystalline phase are mixed.

Further, according to the method for producing a magnetic powder of the present disclosure, since the method includes the mixing step of mixing at least simple elements of Fe, Si, B and P or compounds containing these elements, the heating step of heating a mixed product obtained by the mixing to prepare a molten metal and the spraying step of spraying the inert gas to the molten metal to pulverize the molten metal, and in the mixing step, the single elements or the compounds are mixed so that (a, b), (a, c), and (a, d) satisfy the above-predetermined regions, it is possible to obtain a magnetic powder of high quality, which is spherical and easy to handle, with less restriction of a production process as distinct from the single roll liquid quenching method and without exhibiting an irregular shape of the magnetic powder as distinct from the water atomization method. More since the inert gas is sprayed to the molten metal, it becomes possible to obtain a magnetic powder in which an amount of oxygen is small, and mixing of impurities is suppressed.

Particularly, since in the spraying step, oxygen can be effectively absorbed by hydrogen gas by spraying the mixed gas formed by adding a hydrogen gas to the inert gas to the molten metal, it is possible to obtain, with high efficiency, the magnetic powder of high purity which can suppress mixing of impurities resulting from oxygen.

According to the magnetic core of the present disclosure, since the principal component is formed of the magnetic powder described in any one of the above, it is possible to obtain the magnetic core having good magnetic characteristics in which the saturation magnetic flux density is high and the magnetic loss is low.

According to the method for producing the magnetic core of the present disclosure, since the method includes a forming step of mixing the magnetic powder prepared by the production method described in any one of the above with a binder and forming the resulting mixture to prepare a compact, and a heat treatment step of heat treating the compact, the desired magnetic core having good magnetic characteristics can be easily produced.

Further, according to the coil component of the present disclosure, since a coil conductor is wound around a core part, wherein the core part is formed of the magnetic core, it is possible to easily obtain the coil component having good magnetic characteristics in which the saturation magnetic flux density is high and the magnetic loss is low.

Furthermore, according to the coil component of the present disclosure, since a coil conductor is buried in a magnetic part, wherein the magnetic part is formed of the magnetic core described above, it is possible to easily obtain a coil component having good magnetic characteristics in which the saturation magnetic flux density is high and the magnetic loss is low.

According to the motor of the present disclosure, since a stator core in which a plurality of armature teeth are spaced at regular intervals on the same circumference, a coil conductor wound around the armature teeth, and a rotor core arranged rotatably inside the stator core are included, and the principal component of at least any one of the stator core and the rotor core is formed of the magnetic powder described in any one of the above, it becomes possible to obtain the motor of high quality which is low in power loss.

The above and other objects, features, and advantages of the disclosure will become more apparent from the following description.

DETAILED DESCRIPTION

Next, embodiments of the present disclosure will be described in detail.

A magnetic powder according to the present disclosure contains a Fe—Si—B—P-based alloy as a principal component and is produced with a gas atomization method.

Herein, the principal component means a component which is contained in the magnetic powder, for example, in an amount of 80 wt % or more, preferably 90 wt % or more.

Although the gas atomization method is lower in a cooling rate than the single roll liquid quenching method and the water atomization method or the like, it has less restriction of a production process as distinct from the single roll liquid quenching method, and therefore it is possible to easily obtain a desired magnetic powder. Further, in the gas atomization method, a jet fluid is predominantly composed of an inert gas in contrast to the water atomization method in which water is used for a jet fluid, and therefore absorption of oxygen is lowered, mixing of impurities can be suppressed, and a magnetic powder of high quality which is spherical and easy to handle can be obtained. In other words, in order to obtain the magnetic powder of high quality of the present disclosure having high saturation magnetic flux density and low magnetic loss, it is necessary to suppress the mixing of impurities, and the magnetic powder needs to be produced with the gas atomization method for this.

The above-mentioned Fe—Si—B—P-based alloy can be represented by a general formula (1).

$$Fe_a(Si_bB_cP_d)_{100-a} \quad (1)$$

In the present embodiment, since in the general formula (1), an atomic composition ratio a of Fe and atomic composition ratios b, c, d of each of the constituent elements Si, B, P in $Si_bB_cP_d$ satisfy predetermined ranges, it is possible to obtain a magnetic powder which has high saturation magnetic flux density of not less than 1.30 T and is low in the magnetic loss.

Next, in the general formula (1), relation between the atomic composition ratio a of Fe and the atomic composition ratios b, c, d of each of the constituent elements Si, B, P, will be described.

Figure 1:
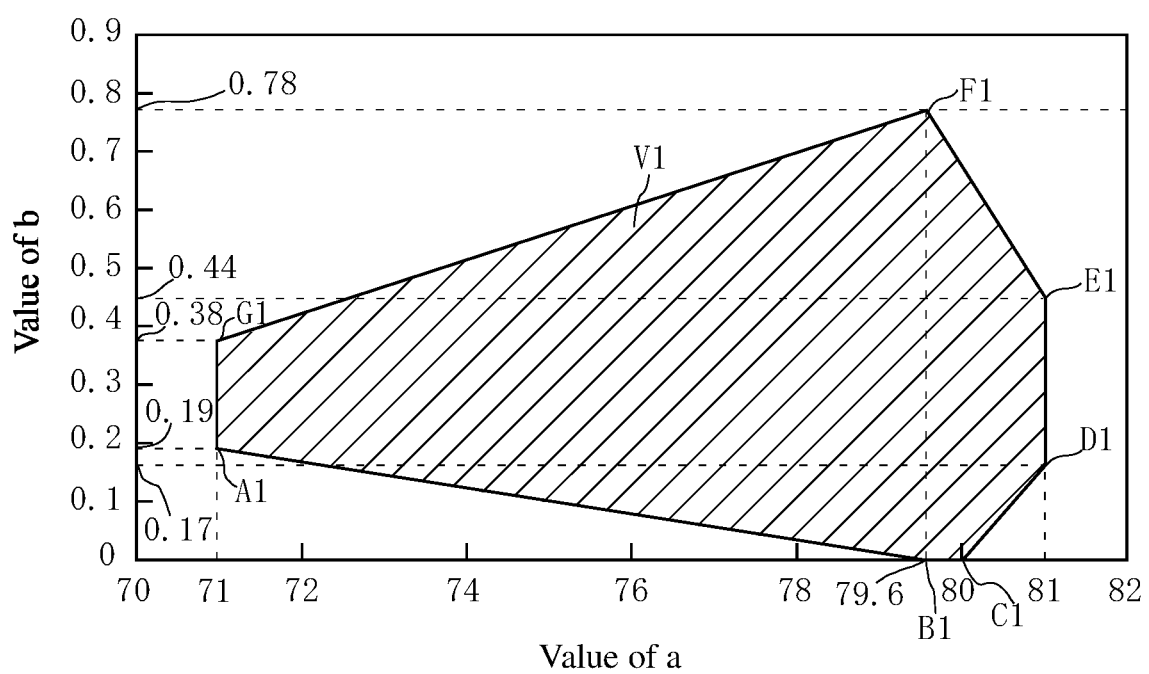
FIG. 1 is a view showing a relation between an atomic composition ratio a of Fe and an atomic composition ratio b of Si in $Si_bB_cP_d$.

FIG. 1 is a view showing a relation between the atomic composition ratio a of Fe and the atomic composition ratio b of Si. In the drawing, a horizontal axis represents the value of a and a vertical axis represents the value of b.

That is, with respect to the atomic composition ratio a of Fe and the atomic composition ratio b of Si, (a, b) satisfies a region V1 surrounded by A1 (71.0, 0.19), B1 (79.6, 0), C1 (80.0, 0), D1 (81.0, 0.17), E1 (81.0, 0.44), F1 (79.6, 0.78) and G1 (71.0, 0.38), which is diagonally shaded, when representing as (a, b) the a and the b.

Fe is an important element assuming a magnetic property and constitutes a predominant element of the general formula (1). In order to ensure desired magnetic characteristics, the value of a needs to be set to 71.0 or more. That is, when the value of a is less than 71.0, the ability of amorphous material formation is lowered to excessively form an α-Fe phase (ferrite phase) having a body-centered cubic crystal structure or a compound phase formed between constituent elements such as Fe—B, and therefore there is a possibility of causing an increase of the magnetic loss. On the other hand, when the value of a exceeds 81.0, the high saturation magnetic flux density can be ensured, but there is a possibility of causing an increase of the magnetic loss.

Si is an element having a good ability of amorphous material formation. However, when the value of b which is the atomic composition ratio of Si becomes excessively small or large, there is a possibility of causing an increase of the magnetic loss, and therefore the value of b needs to be controlled within a moderate range.

Thus, in the present embodiment, compounding amounts of Fe and Si are adjusted so that the value of a and the value of b, that is (a, b), satisfy the region V1.

Figure 2:
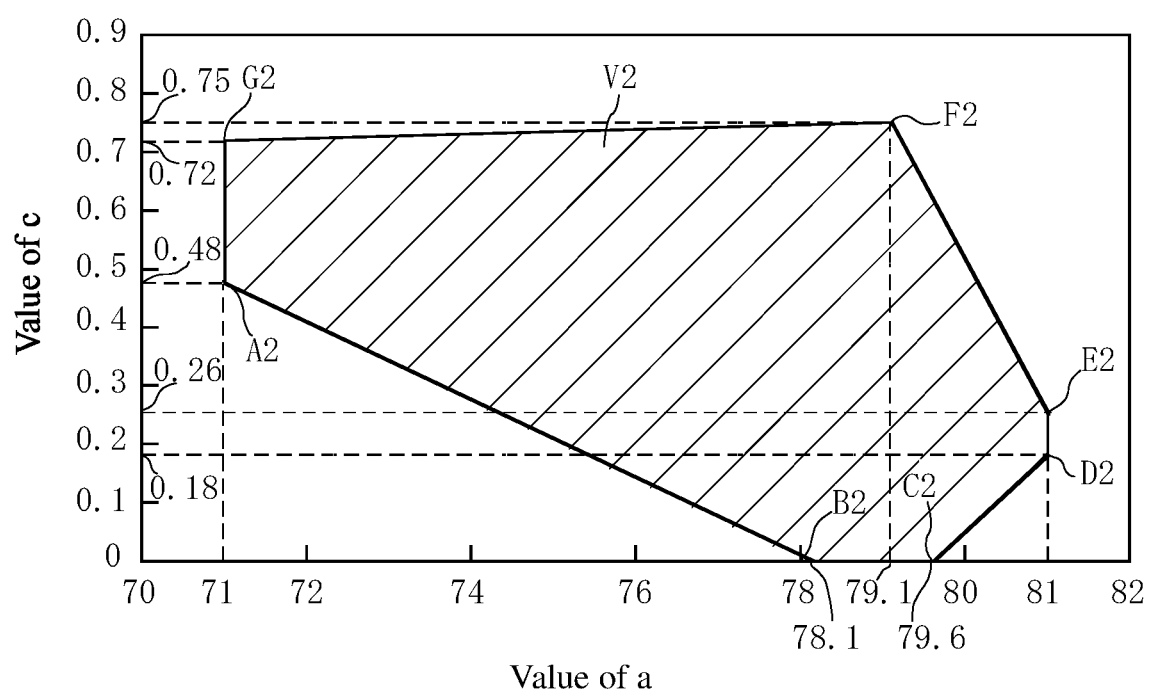
FIG. 2 is a view showing a relation between an atomic composition ratio a of Fe and an atomic composition ratio c of B in $Si_bB_cP_d$.

FIG. 2 is a view showing a relation between the atomic composition ratio a of Fe and the atomic composition ratio c of B. In the drawing, a horizontal axis represents the value of a and a vertical axis represents the value of c.

That is, with respect to the atomic composition ratio a of Fe and the atomic composition ratio c of B, (a, c) satisfies a region V2 surrounded by A2 (71.0, 0.48), B2 (78.1, 0), C2 (79.6, 0), D2 (81.0, 0.18), E2 (81.0, 0.26), F2 (79.1, 0.75) and G2 (71.0, 0.72), which is diagonally shaded, when representing as (a, c) the a and the c.

The value of a which is the atomic composition ratio of Fe needs to be adjusted to a range of 71.0 to 81.0 for the reason described above. Further, B is an element having a good ability of amorphous material formation as with Si, but when the value of c which is the atomic composition ratio of B becomes excessively small or large, there is a possibility of causing an increase of the magnetic loss, and therefore the value of c also needs to be controlled within a moderate range.

Thus, in the present embodiment, compounding amounts of Fe and B are adjusted so that the value of a and the value of c, that is (a, c), satisfy the region V2.

Figure 3:
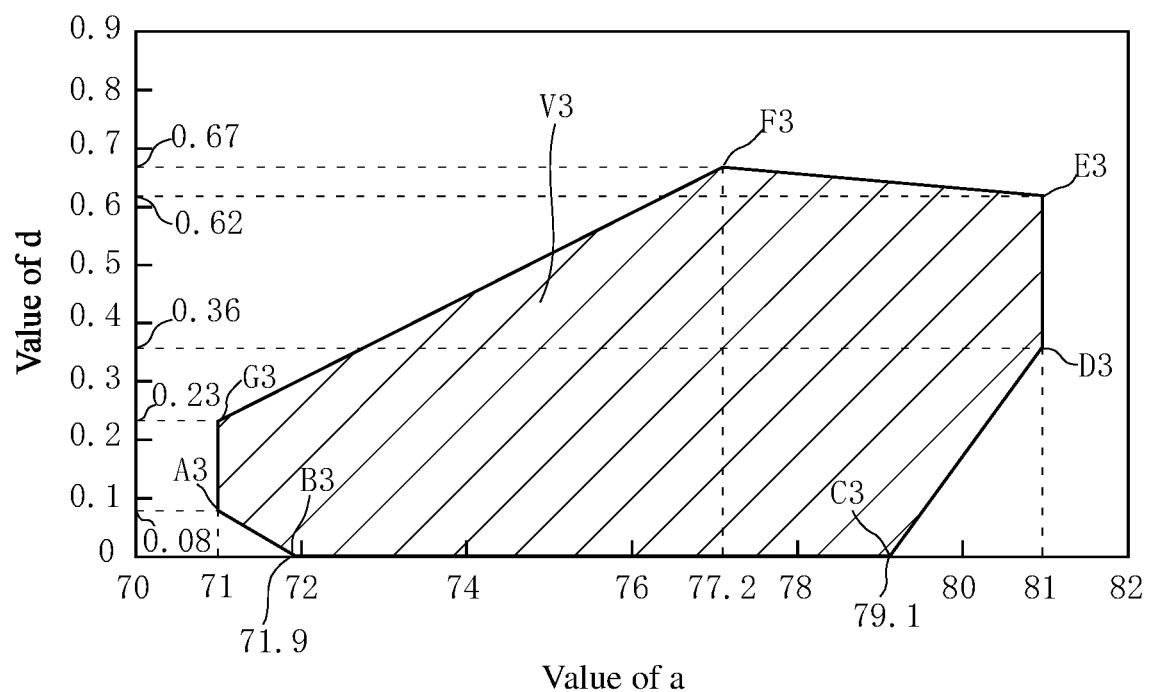
FIG. 3 is a view showing a relation between an atomic composition ratio a of Fe and an atomic composition ratio d of P in $Si_bB_cP_d$.

FIG. 3 is a view showing a relation between the atomic composition ratio a of Fe and the atomic composition ratio d of P. In the drawing, a horizontal axis represents the value of a and a vertical axis represents the value of d.

That is, with respect to the atomic composition ratio a of Fe and the atomic composition ratio d of P, (a, d) satisfies a region V3 surrounded by A3 (71.0, 0.08), B3 (71.9, 0), C3 (79.1, 0), D3 (81.0, 0.36), E3 (81.0, 0.62), F3 (77.2, 0.67)

and G3 (71.0, 0.23), which is diagonally shaded, when representing as (a, d) the a and the d.

The value of a which is the atomic composition ratio of Fe needs to be adjusted to a range of 71.0 to 81.0 for the reason described above. Further, P is an element having a good ability of amorphous material formation as with Si and B, but when the value of d which is the atomic composition ratio of P becomes excessively small or large, there is a possibility of causing an increase of the magnetic loss, and therefore the value of d also needs to be controlled within a moderate range.

Thus, in the present embodiment, compounding amounts of Fe and P are adjusted so that the value of a and the value of d, that is (a, d), satisfy the region V3.

As described above, in the present embodiment, by adjusting the compounding amounts of Fe, Si, B and P so that the general formula (1) satisfies all of the regions V1 to V3 and by producing the magnetic powder with the gas atomization method, it is possible to obtain the magnetic powder of high quality which has high saturation magnetic flux density, low magnetic loss, and is spherical and easy to handle. That is, the adjustment of the compounding amounts of Fe, Si, B and P is coupled with the production with the gas atomization method to enable to obtain desired magnetic powder of high quality which has high saturation magnetic flux density, low magnetic loss, and is spherical and easy to handle. Specifically, it is possible to obtain the magnetic powder which has high saturation magnetic flux density of not less than 1.30 T.

Further, in the present magnetic powder, when the general formula (1) satisfies the regions V1 to V3, the crystallinity X indicating a portion of the crystalline phase is not more than 30%. Accordingly, If the crystallinity X is not more than 30%, it is possible to obtain the magnetic powder which has the high quality having high saturation magnetic flux density and low magnetic loss not only in the case of being formed of only the amorphous phase but also even in the case where the crystalline phase, such as the α-Fe phase having the body-centered cubic crystal structure or the compound phase formed between constituent elements such as Fe—B, and the amorphous phase are mixed, which are not inferior to the case of being formed of only the amorphous phase.

Besides, the crystallinity X can be easily calculated using an X-ray diffraction method.

Figure 4:
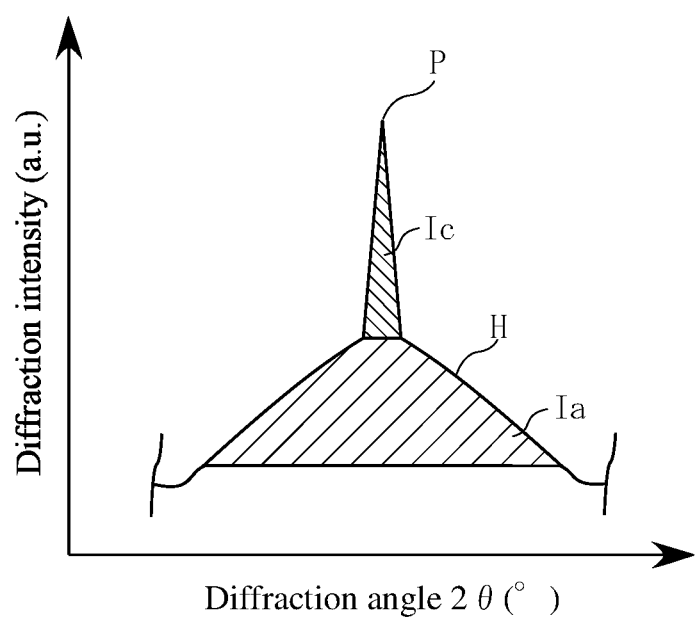
FIG. 4 is a view showing one embodiment of a diffraction peak of a magnetic powder of the present disclosure.

FIG. 4 shows an essential part of an X-ray diffraction spectrum of the magnetic powder, and a horizontal axis represents a diffraction angle 2θ (°) and a vertical axis represents diffraction intensity (a. u.).

When the crystalline phase and the amorphous phase are mixed in the magnetic powder, in the X-ray diffraction spectrum, as shown in FIG. 4, a portion indicating a crystalline phase has a diffraction peak P, and a portion indicating an amorphous phase forms halo H in a predetermined range of a diffraction angle 2θ (e.g., 34° to 56°). Then, the crystallinity X can be represented by a formula (I) when an area of a peak region exhibiting crystallinity is denoted by Ic, and an area of a halo region exhibiting an amorphous property is denoted by Ia.

$$X=\{Ic/(Ic+Ia)\} \times 100 \quad (I)$$

Besides, when a plurality of peak regions are present on the halo region, the area of the peak region Ic is an integrated value of each peak region.

Further, as described above, when the general formula (1) satisfies the regions V1 to V3, the magnetic powder has the crystallinity X of at least 0% and not more than 30%.

Furthermore, in the magnetic powder of the present disclosure, it is also preferred that a portion of Fe is substituted with Co and/or Ni, and in this case, the magnetic powder can be represented by a general formula (2).

$$Fe_{a-e}M_e(Si_bB_cP_d)_{100-a} \quad (2)$$

Herein, M is Co and/or Ni.

Since Co and Ni lower a magnetostrictive action, it becomes possible to improve soft magnetic characteristics.

However, if a portion of the Fe is substituted with Co and Ni to such an extent that a total atomic composition ratio e of Co and Ni exceeds 12 at %, the ability of amorphous material formation is lowered to form an excessive crystal phase, and there is a possibility of causing a reduction of magnetic characteristics.

Accordingly, when a portion of the Fe is substituted with Co and/or Ni, the substitution is preferably performed within a range in which the total atomic composition ratio e is not more than 12 at %.

Further, in the magnetic powder of the present disclosure, it is also preferred that a portion of B is substituted with C, and in this case, the magnetic powder can be represented by a general formula (3) or (4).

$$Fe_a\{Si_b(B_{1-\alpha}C_\alpha)_cP_d\}_{100-a} \quad (3)$$

$$Fe_{a-e}M_e\{Si_b(B_{1-\alpha}C_\alpha)_cP_d\}_{100-a} \quad (4)$$

C is an element contributing to formation of the amorphous phase as with Si, B and P, and has an action of lowering a melting point, and therefore it becomes possible to synthesize at low-temperature.

However, if a portion of the B is substituted with C to such an extent that an atomic composition ratio α of C exceeds 85 at %, it is not preferred because there is a possibility of causing an increase of the magnetic loss.

Accordingly, when a portion of the B is substituted with C, the substitution is preferably performed within a range in which the atomic composition ratio α is not more than 85 at %.

In addition, also in the case of the magnetic powder specified by the general formulas (2) to (4), the crystallinity X is at least 0% and not more than 30%.

Next, the method for producing the magnetic powder will be described in detail.

Figure 5:
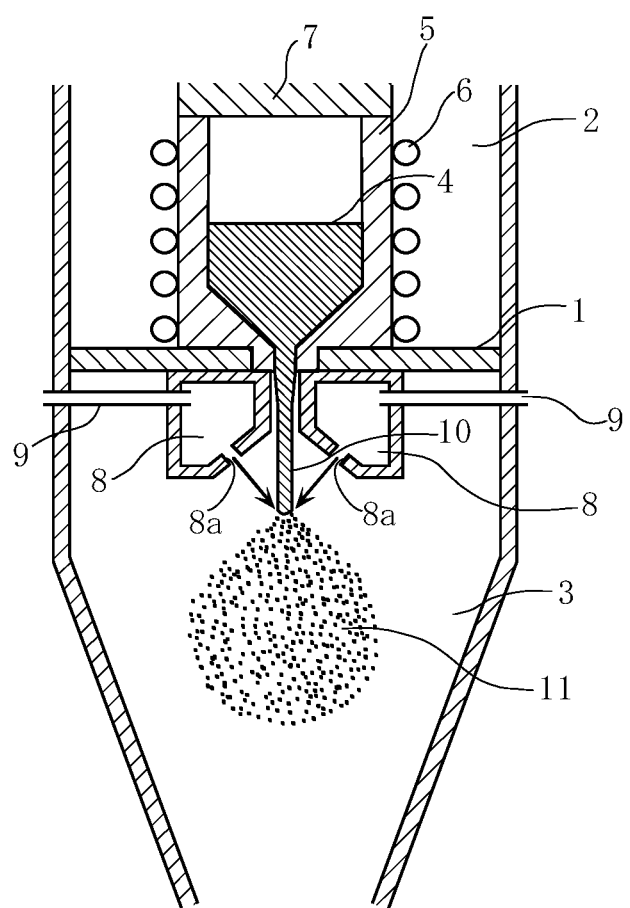
FIG. 5 is a sectional view showing an embodiment of a gas atomization device.

FIG. 5 is a sectional view showing an embodiment of a gas atomization device used in the method for producing the magnetic powder.

The gas atomization device is divided into a melting chamber 2 and a spraying chamber 3 with a divider 1 interposed between the melting chamber 2 and the spraying chamber 3.

The melting chamber 2 includes a crucible 5 formed of alumina or the like in which the molten metal 4 is held, and an induction heating coil 6 arranged at a perimeter of the crucible 5, and a top panel 7 to put the lid on the crucible 5.

The spraying chamber 3 includes a gas injection chamber 8 provided with an injection nozzle 8a, a gas supply tube 9 which supplies an inert gas as a jet fluid to the gas injection chamber 8, and a molten metal supply tube 10 which guides a molten metal 4 to the spraying chamber 3.

The magnetic powder can be produced in the following manner.

First, simple elements of Fe, Si, B and P or compounds containing these elements are prepared as base materials, and further simple elements of Co and/or Ni, and C or compounds containing these elements are prepared as required, and predetermined amounts of them are weighed and mixed to obtain the alloy material.

Next, a high frequency power source is applied to the induction heating coil 6 to heat the crucible 5, and an alloy material is supplied to the crucible 5 to melt the alloy material, and thereby, the molten metal 4 is obtained.

Then, the inert gas as the jet fluid is supplied to the gas supply tube 9 and the gas injection chamber 8, and the inert gas is sprayed from the injection nozzle 8a to the molten metal 4 falling from the molten metal supply tube 10, as indicated by an arrow to pulverize/quench the molten metal 4, and thereby, the magnetic powder 11 having, for example, an average particle size of 100 µm or less and represented by the general formulas (1) to (4), is prepared.

As described above, in the present embodiment, since the magnetic powder is produced with the gas atomization method in which the inert gas is used for the jet fluid, it is possible to obtain the magnetic powder of high quality, which is spherical and easy to handle, with less restriction of the production process as distinct from the single roll liquid quenching method and without exhibiting the irregular shape of the magnetic powder as distinct from the water atomization method. Further, since the inert gas is used for the jet fluid, the amount of oxygen is small, and it becomes possible to suppress mixing of impurities.

In the above-production method, the inert gas is used for the jet fluid in spraying treatment, and further it is also preferred to use a mixed gas formed by adding a hydrogen gas to an inert gas.

Atmospheres of heating treatment and spraying treatment are not particularly referred to; however, these treatments are preferably performed in the inert gas atmosphere, and more preferably performed in the atmosphere of a mixed gas formed by adding a hydrogen gas to the inert gas.

That is, by bringing the spraying chamber 3 into the mixed gas atmosphere and performing spraying treatment, mixing of oxygen in the magnetic powder 11 can be more effectively avoided, and therefore mixing of impurities resulting from oxygen can be avoided as much as possible.

Further, an applied voltage is increased to increase a heat input to the crucible 5 by bringing the melting chamber 2 into the mixed gas atmosphere described above and performing high frequency induction heating and this enables high speed melting to quickly prepare a molten metal 4.

In addition, the content ratio of the hydrogen gas in the mixed gas is not particularly limited; however, it is preferably 0.5 to 7% in terms of partial pressure from a practical viewpoint such as industrial availability.

The inert gas used for the jet fluid or the atmospheric gas in heating treatment and spraying treatment is not particularly limited as long as it belongs to a category of the inert gas, and a helium gas, a neon gas or the like can be also used; however, an argon gas which is easily available and low-cost is usually preferably used.

As described above, in the present embodiment, performing of induction heating in the atmosphere of the mixed gas formed by adding the hydrogen gas to the inert gas enables high speed melting of the alloy material, and spraying of the mixed gas formed by adding the hydrogen gas to the inert gas to the molten metal enables to more effectively suppress the mixing of impurities in the magnetic powder 11, and therefore it is possible to quickly and efficiently obtain the magnetic powder of high quality and high purity which has high saturation magnetic flux density and low magnetic loss, and is spherical and easy to handle.

Figure 6:
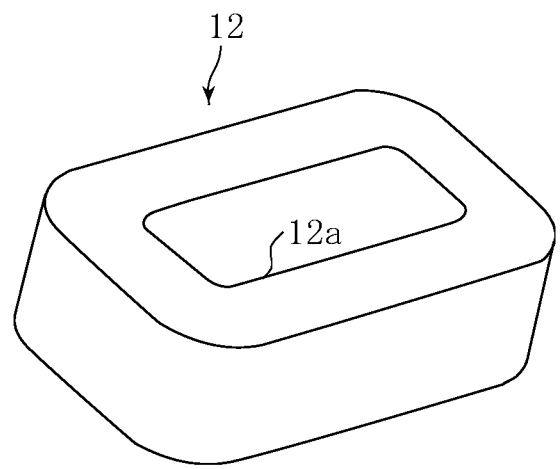
FIG. 6 is a perspective view showing an embodiment of a magnetic core according to the present disclosure.

FIG. 6 is a perspective view showing an embodiment of a magnetic core according to the present disclosure, and the magnetic core 12 is formed in a ring shape having a long hole-like hole part 12a.

The magnetic core 12 is formed of a composite material which contains the magnetic powder of the present disclosure described above as a principal component and at least a resin material (binder) such as an epoxy resin.

In addition, the content of the magnetic powder in the composite material is not particularly limited, and is preferably not less than 60 vol % in terms of volume ratio. When the content of the magnetic powder is less than 60 vol %, the content of the magnetic powder is excessively low, and there is a possibility that magnetic permeability or the saturation magnetic flux density is lowered to cause lowering of magnetic characteristics. An upper limit of the content of the magnetic powder is preferably 99 vol % or less, since the magnetic powder has only to be contained to an extent that a resin material achieves a desired operation and effect.

The magnetic core can be easily produced in the following manner.

The present magnetic powder described above and a resin material (binder) such as the epoxy resin are kneaded and dispersed to prepare a composite material. Then, forming is performed using, for example, a compression forming method to prepare a compact. That is, the composite material is poured into a cavity of a heated die, pressurized to about 100 MPa, and pressed to prepare the compact.

Thereafter, the compact is taken out of a forming die, and subjected to heat treatment at a temperature of 120 to 150° C. for approximately 24 hours to accelerate curing of a resin material, and thereby, the magnetic core 12 is prepared.

Figure 7:
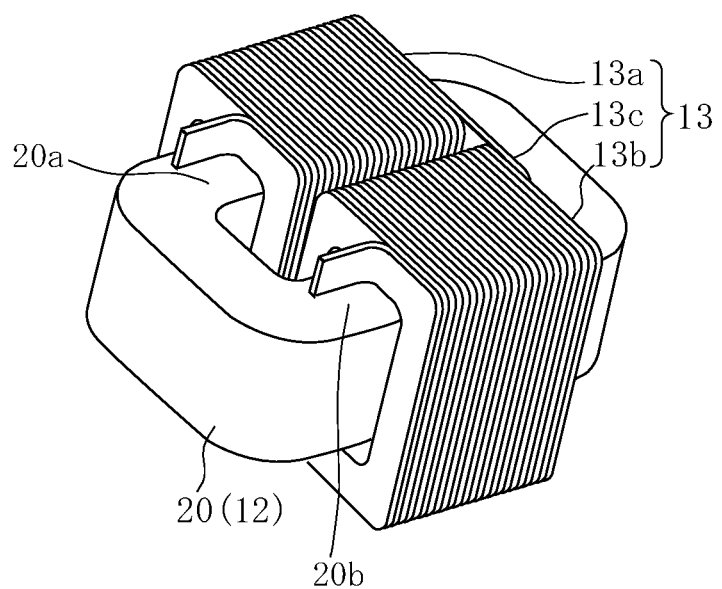
FIG. 7 is a perspective view showing an internal structure of a reactor as a first embodiment of a coil component according to the present disclosure.

FIG. 7 is a perspective view showing a reactor as a first embodiment of the coil component according to the present disclosure.

In the reactor, a coil conductor 13 is wound around a core part 20, and the core part 20 is formed of the magnetic core 12.

That is, the long hole-like core part 20 has two long side parts 20a and 20b parallel to each other. The coil conductor 13 consists of a first coil conductor 13a wound around one long side part 20a, a second coil conductor 13b wound around the other long side part 20b, and a connecting part 13c which connects the first coil conductor 13a and the second coil conductor 13b, and these first coil conductor 13a, second coil conductor 13b and connecting part 13c are unified. Specifically, in the coil conductor 13, one rectangular wire lead made of copper or the like is coated with an insulating resin such as a polyester resin or a polyamide imide resin, and wound around both of the one long side part 20a and the other long side part 20b of the coil conductor 20 in the form of a coil.

Thus, in the present reactor, since the coil conductor 13 is wound around the core part 20 composed of the magnetic core 12, it is possible to obtain, with high efficiency, the reactor of high purity and high quality which has high saturation magnetic flux density and low magnetic loss, and has good soft magnetic characteristics that a magnetic property is ferromagnetic and a hysteresis characteristic is small.

Figure 8:
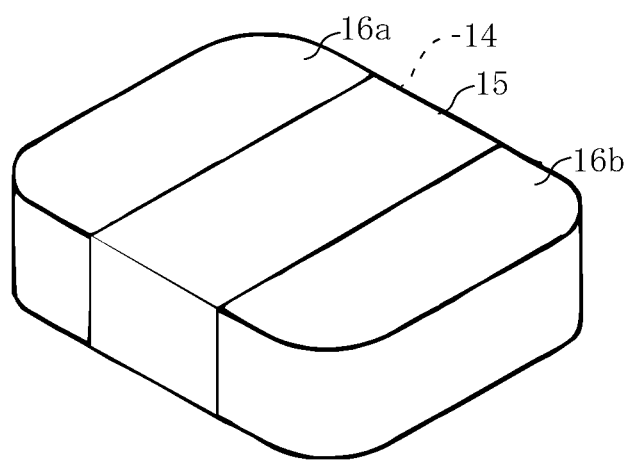
FIG. 8 is a perspective view of an inductor as a second embodiment of a coil component according to the present disclosure.

FIG. 8 is a perspective view of an inductor as a second embodiment of the coil component according to the present disclosure.

In the inductor, a protection layer 15 is formed on an almost central part of the surface of the magnetic part 14 formed into a rectangular shape, and a pair of external electrodes 16a and 16b are formed in a state of sandwiching the protection layer 15 at both ends of the surface of the magnetic part 14.

Figure 9:
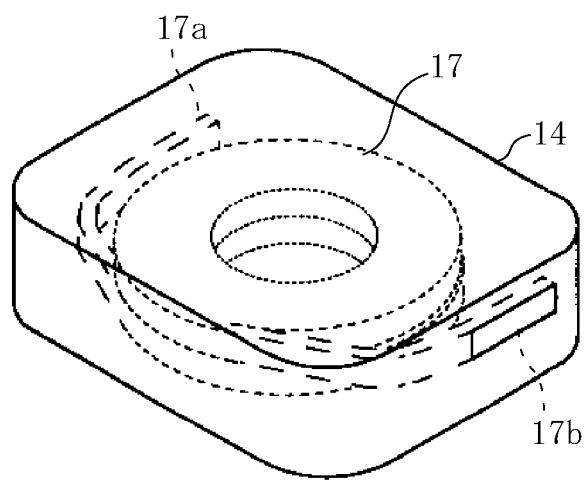
FIG. 9 is a perspective view showing an internal structure of the above inductor.

FIG. 9 is a perspective view showing an internal structure of the inductor. In FIG. 9, the protection layer 15 and the external electrodes 16a and 16b are omitted for convenience of explanation.

The magnetic part 14 contains the magnetic powder of the present disclosure as a principal component as with the magnetic core 12, and is formed of a composite material containing a resin material such as an epoxy resin. A coil conductor 17 is buried in the magnetic part 14.

In addition, the content of the magnetic powder in the composite material is not particularly limited, and is preferably not less than 60 vol % in terms of volume ratio, and more preferably 60 to 99 vol % for the same reason as in the magnetic core 12 described above.

The coil conductor 17 has a cylindrical shape formed by winding a rectangular wire in the form of a coil, and both ends 17a and 17b are exposed to the end surface of the magnetic part 14 so that both ends 17a and 17b can be electrically connected to the external electrodes 16a and 16b. Specifically, in the coil conductor 17, as with the first embodiment, a rectangular wire lead made of copper or the like is coated with an insulating resin such as a polyester resin or a polyamide imide resin and formed into a belt shape, and wound in the form of a coil so as to have a hollow core.

The inductor can be easily prepared in the following manner.

First, the present magnetic powder and the resin material are kneaded and dispersed to prepare the composite material as with the first embodiment. Then, the coil conductor 17 is buried in the composite material so that the coil conductor 17 is sealed with the composite material. A forming process is applied using, for example, a compression forming method to obtain the compact in which the coil conductor 17 is buried. Then, the compact is taken out of a forming die, heat treated, and subjected to surface polishing to obtain the magnetic part 14 in which ends 17a and 17b of the coil conductor 17 are exposed to end surfaces.

Next, an insulating resin is applied to the surface of the magnetic part 14 other than an area where the external electrodes 16a and 16b are formed and the resin is cured to form the protection layer 15.

Thereafter, the external electrodes 16a and 16b containing the conductive material as the principal component are formed at both ends of the magnetic part 14, and thereby, the inductor is prepared.

The method of forming the external electrodes 16a and 16b is not particularly limited, and these electrodes can be formed by an optional method, such as an application method, a plating method, and a thin film forming method.

Thus, in the present inductor, since the coil conductor 17 is buried in the magnetic part 14 and the magnetic part 14 contains the above-mentioned magnetic powder as a principal component, it is possible to obtain, with high efficiency, the coil component of high purity and high quality which has high saturation magnetic flux density and low magnetic loss, and has good soft magnetic characteristics that the magnetic property is ferromagnetic and the hysteresis characteristic is small.

In addition, the present disclosure is not limited to the above-mentioned embodiments, and various variations may be made without departing from the gist of the disclosure. While in the above embodiments, coil components such as a reactor and an inductor are exemplified as a device using a magnetic powder, the present magnetic powder has high saturation magnetic flux density and low magnetic loss, and therefore the magnetic powder can also be applied to a stator core and a rotor core equipped in a motor. That is, the motor usually includes the stator core in which a plurality of armature teeth are spaced at regular intervals on the same circumference; the coil conductor wound around the armature teeth; and the rotor core arranged rotatably inside the stator core. Then, since the present magnetic powder has high saturation magnetic flux density and low magnetic loss, when the principal component of at least one, preferably both, of the stator core and the rotor core is the present magnetic powder, it becomes possible to obtain a motor of high quality which is low in power loss.

Further, the production method of the magnetic core 12 or the magnetic part 14 is not limited to the compression forming method described above, and an injection molding method or a transfer molding method may be used.

Element species constituting the present magnetic powder may be used as long as the alloy composition satisfies the above-mentioned range, and another element having the ability of amorphous material formation, for example, Ga, Ge or Pd, may be appropriately added. Further, even though the powder contains a trace of impurities such as Mn, Al, $N_2$ and Ti, characteristics are not affected.

In the above-embodiments, the mixed product is heated/melted by high frequency induction heating; however, a heating/melting method is not limited to the high frequency induction heating, and for example, arc melting may be employed.

Next, examples of the present disclosure will be specifically described.

EXAMPLES

Example 1

Preparation of Sample[0160] Fe, Si, B, and $Fe_3P$ were prepared as base materials. Then, these materials were mixed so that in the general formula $Fe_a(Si_bB_cP_d)_{100-a}$, a, b, c, and d were atomic composition ratios shown in Tables 1 to 7, respectively, and the resulting mixtures were each heated to a melting point or higher in a high frequency induction furnace to be melted, and then the melted products were poured into a casting mold made of copper and cooled, and thereby master alloys were prepared.

Next, each of these master alloys was pulverized into a size of about 5 mm, and a gas atomization device brought into an atmosphere of a mixed gas formed by adding a hydrogen gas of 3% on the partial pressure basis to an argon gas, was prepared. Then, the master alloy was charged into a crucible of the gas atomization device, and melted by high frequency induction heating to obtain a molten metal.

Subsequently, in the above-mentioned mixed gas atmosphere, the argon gas adding the hydrogen gas as the jet fluid was sprayed to the molten metal to pulverize/quench the molten metal, and thereby an alloy powder was obtained. Then, the alloy powder was passed through a sieve with an opening of 38 μm to obtain samples of Nos. 1 to 123.

An average particle size of each of the obtained samples was measured with a particle size distribution analyzer (LA-300 manufactured by HORIBA, Ltd.), and consequently the average particle size was 23 to 29 μm.

Evaluation of Samples (Measurement of Saturation Magnetic Flux Density)

10 mg of each of samples of Nos. 1 to 123 was taken, the sample was placed on a non-magnetic adhesive tape, and the adhesive tape was doubled up to be formed into a plate of 7 mm long and 7 mm wide. Next, saturation magnetization was measured at a maximum applied magnetic field of 12000 A/m at a room temperature (25° C.) using Vibrating Sample Magnetometer (VSM-5-10 manufactured by Toei Industry Co., Ltd.). Saturation magnetic flux density was calculated from the measured value and a true specific gravity of the sample.

(Identification of Powder Structure)

Using a powder X-ray diffractometer (RINT2200 manufactured by Rigaku Corporation), an X-ray diffraction spectrum was measured in measuring conditions of step width of 0.02° and step time of 2 seconds in a range in which a diffraction angle 2θ ranges from 30° to 90°, and a powder structure phase of each sample was identified from the X-ray diffraction spectrum.

Figure 10:
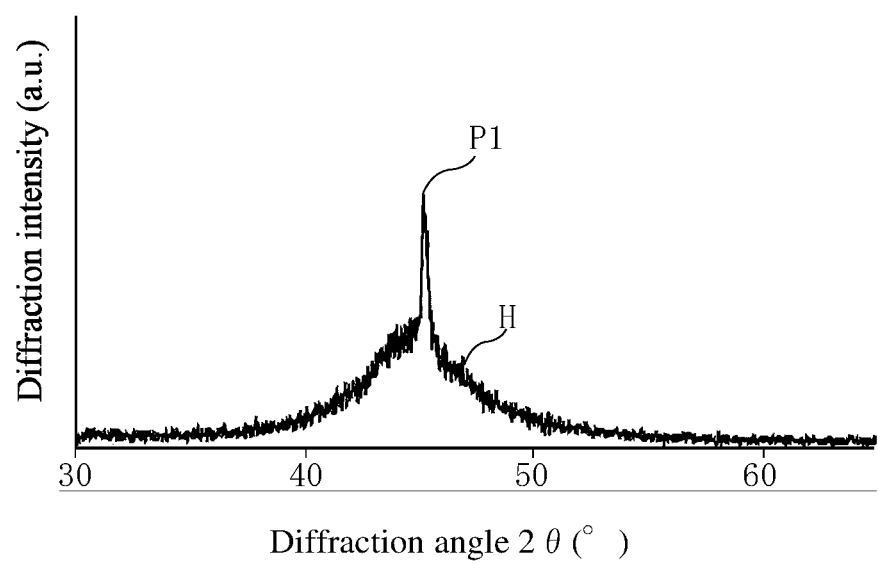
FIG. 10 is an X-ray diffraction spectrography of a sample No. 11.
Figure 11:
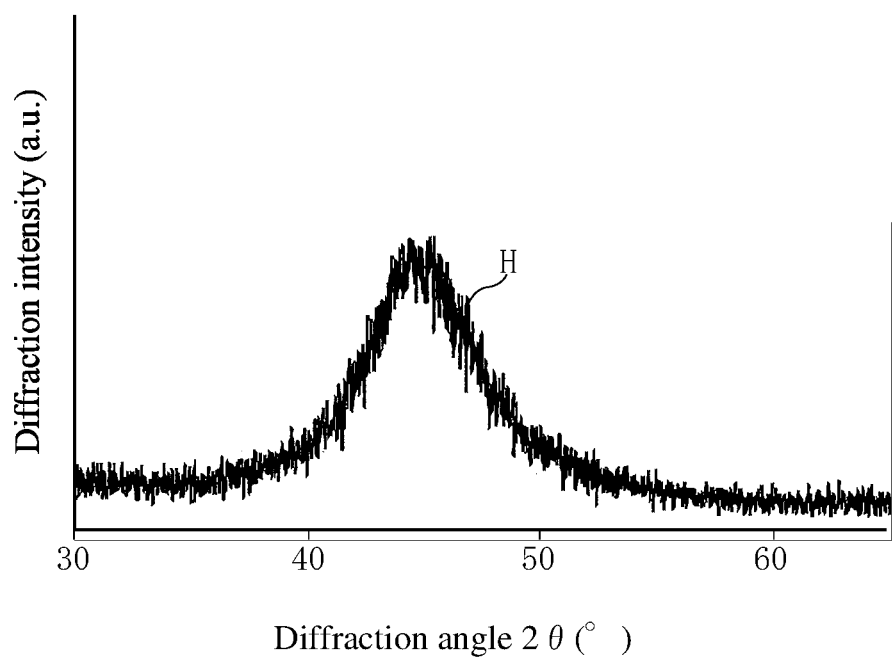
FIG. 11 is an X-ray diffraction spectrography of a sample No. 18.
Figure 12:
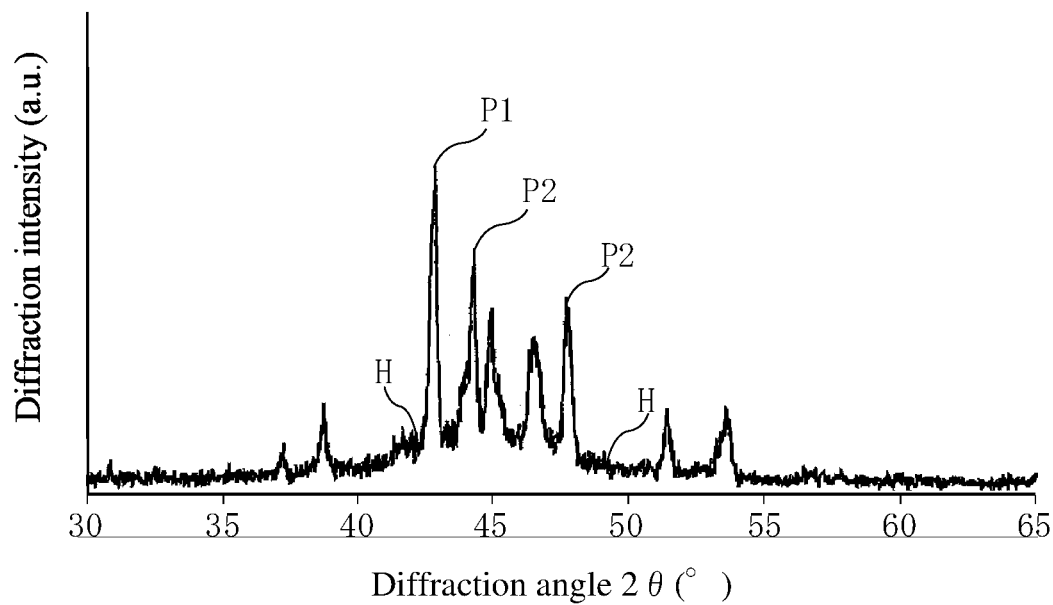
FIG. 12 is an X-ray diffraction spectrography of a sample No. 65.
Figure 13:
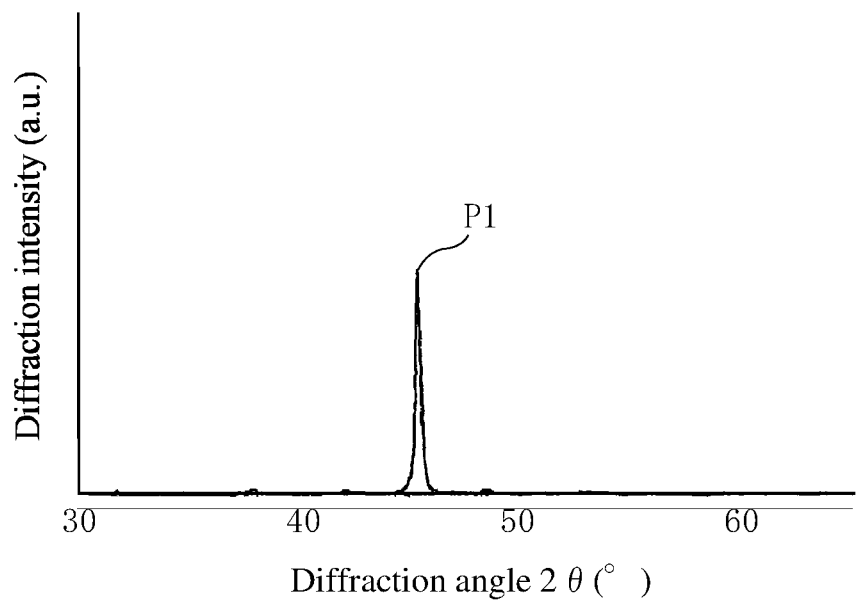
FIG. 13 is an X-ray diffraction spectrography of a sample No. 84.

FIGS. 10 to 13 show examples of an X-ray diffraction spectrography. Specifically, FIG. 10 shows an X-ray diffraction spectrography of the sample No. 11, and FIG. 11 shows an X-ray diffraction spectrography of the sample No. 18. FIG. 12 shows an X-ray diffraction spectrography of the sample No. 65, and FIG. 13 shows an X-ray diffraction spectrography of the sample No. 84. In FIGS. 10 to 13, a horizontal axis represents a diffraction angle 2θ (°) and a vertical axis represents a diffraction intensity (a.u.).

As shown in FIG. 10, in the sample No. 11, the halo H indicating the amorphous phase was detected, and a peak P1 indicating the crystalline phase was present. The peak P1 represents the body-centered cubic crystal structure because the diffraction angle 2θ appears in the vicinity of 45°, and the body-centered cubic crystal structure is thought to be the α-Fe phase from alloy composition. Accordingly, it can be identified that the sample No. 11 has the amorphous phase and the α-Fe phase.

A shown in FIG. 11, in the sample No. 18, a peak indicating the crystalline phase was not present, and only the halo H indicating the amorphous phase was detected, and therefore it can be identified that the sample No. 18 is a single-phase of the amorphous phase.

As shown in FIG. 12, in the sample No. 65, the halo H indicating the amorphous phase, the peak P1 indicating the α-Fe phase and a peak P2 indicating another crystalline phase other than the α-Fe phase were detected. Since the peak P2 is considered as a compound phase formed by coupling between constituent elements, such as Fe—B, it can be identified that the sample No. 65 has the amorphous phase, the α-Fe phase and the compound phase.

A shown in FIG. 13, in the sample No. 84, the halo H indicating an amorphous phase nor a peak P2 indicating a compound phase were not detected, and only a peak P1 indicating the body-centered cubic crystal structure was detected, and therefore it can be identified that sample No. 84 is the single-phase of the α-Fe phase.

Similarly, the powder structural phase of each of sample Nos. 1 to 10, 12 to 17, 19 to 64, 66 to 83, and 85 to 123 was identified from the X-ray diffraction spectrum.

Further, the crystallinity X of each sample was calculated based on the formula (I) described in DETAILED DESCRIPTION from the X-ray diffraction spectrum.

(Magnetic Loss)

3 parts by weight of an epoxy resin was added to 100 parts by weight of each of sample Nos. 1 to 123 (volume content of the magnetic powder was 85 vol %), and the resulting mixture was press formed at a pressure of 100 MPa to prepare a toroidal core having an outer diameter of 13 mm, an inner diameter of 8 mm and a thickness of 2.5 mm.

An enameled copper wire having a wire diameter of 0.3 mm was double wound around the periphery of a toroidal core so that the number of turns of primary windings for excitation and the number of turns of secondary windings for voltage detection were each 16 to obtain a sample for measuring the core loss.

Then, using a B-H analyzer (SY-8217 manufactured by IWATSU ELECTRIC CO., LTD.), a core loss (magnetic loss) was measured at a frequency of 1 MHz and at a magnetic field of 30 mT.

(Measurements)

Tables 1 to 7 shows component composition, saturation magnetization, saturation magnetic flux density, identified phase of a powder structure, and a core loss of each of sample Nos. 1 to 123. In addition, in Tables 4 to 7, a mark "*" indicates a sample out of a scope of the claimed disclosure.

TABLE 1

| Sample No. | General formula: $Fe_a(Si_bB_cP_d)_{100-a}$ | | | | Saturation magnetization ($A \cdot m^2/kg$) | Saturation magnetic flux density (T) | Identified phase | Core loss ($kW/m^3$) |
|---|---|---|---|---|---|---|---|---|
| | a | b | c | d | | | | |
| 1 | 76.0 | 0.30 | 0.40 | 0.30 | 169 | 1.51 | amorphous | 1657 |
| 2 | 76.0 | 0.40 | 0.30 | 0.30 | 160 | 1.42 | amorphous | 1593 |
| 3 | 76.0 | 0.30 | 0.30 | 0.40 | 155 | 1.38 | amorphous | 1581 |
| 4 | 76.0 | 0.40 | 0.20 | 0.40 | 158 | 1.40 | amorphous | 2185 |
| 5 | 76.0 | 0.50 | 0.20 | 0.30 | 157 | 1.41 | amorphous α-Fe compound | 3422 |
| 6 | 76.0 | 0.20 | 0.50 | 0.30 | 164 | 1.47 | amorphous | 1612 |
| 7 | 76.0 | 0.20 | 0.40 | 0.40 | 161 | 1.43 | amorphous | 2179 |
| 8 | 76.0 | 0.20 | 0.30 | 0.50 | 153 | 1.36 | amorphous | 2195 |
| 9 | 76.0 | 0.30 | 0.20 | 0.50 | 154 | 1.37 | amorphous | 2343 |
| 10 | 76.0 | 0.40 | 0.50 | 0.10 | 163 | 1.46 | amorphous | 1986 |
| 11 | 76.0 | 0.50 | 0.40 | 0.10 | 166 | 1.48 | amorphous α-Fe | 2446 |
| 12 | 76.0 | 0.50 | 0.30 | 0.20 | 164 | 1.47 | amorphous α-Fe | 2289 |
| 13 | 76.0 | 0.20 | 0.60 | 0.20 | 163 | 1.48 | amorphous α-Fe compound | 3028 |
| 14 | 76.0 | 0.30 | 0.70 | 0.00 | 169 | 1.54 | amorphous α-Fe | 3342 |

TABLE 1-continued

| Sample No. | General formula: $Fe_a(Si_bB_cP_d)_{100-a}$ | | | | Saturation magnetization ($A \cdot m^2/kg$) | Saturation magnetic flux density (T) | Identified phase | Core loss ($kW/m^3$) |
|---|---|---|---|---|---|---|---|---|
| | a | b | c | d | | | | |
| 15 | 76.0 | 0.50 | 0.50 | 0.00 | 165 | 1.48 | amorphous α-Fe | 2856 |
| 16 | 76.0 | 0.61 | 0.39 | 0.00 | 165 | 1.46 | amorphous α-Fe | 2720 |
| 17 | 74.0 | 0.37 | 0.42 | 0.21 | 158 | 1.40 | amorphous | 1833 |
| 18 | 75.0 | 0.37 | 0.42 | 0.21 | 157 | 1.39 | amorphous | 1668 |
| 19 | 73.0 | 0.37 | 0.42 | 0.21 | 154 | 1.36 | amorphous | 1913 |
| 20 | 71.0 | 0.30 | 0.50 | 0.20 | 146 | 1.30 | amorphous α-Fe | 3180 |
| 21 | 71.0 | 0.20 | 0.70 | 0.10 | 148 | 1.31 | amorphous α-Fe compound | 3409 |
| 22 | 71.0 | 0.20 | 0.72 | 0.08 | 161 | 1.43 | amorphous α-Fe compound | 3441 |
| 23 | 71.0 | 0.38 | 0.48 | 0.14 | 154 | 1.37 | amorphous α-Fe | 3393 |
| 24 | 72.9 | 0.28 | 0.72 | 0.00 | 162 | 1.47 | amorphous α-Fe compound | 2778 |

TABLE 2

| Sample No. | General formula: $Fe_a(Si_bB_cP_d)_{100-a}$ | | | | Saturation magnetization ($A \cdot m^2/kg$) | Saturation magnetic flux density (T) | Identified phase | Core loss ($kW/m^3$) |
|---|---|---|---|---|---|---|---|---|
| | a | b | c | d | | | | |
| 25 | 72.0 | 0.42 | 0.44 | 0.14 | 149 | 1.32 | amorphous α-Fe | 3113 |
| 26 | 72.0 | 0.37 | 0.42 | 0.21 | 150 | 1.33 | amorphous α-Fe | 3173 |
| 27 | 77.0 | 0.37 | 0.42 | 0.21 | 169 | 1.51 | amorphous | 1669 |
| 28 | 77.2 | 0.17 | 0.17 | 0.66 | 156 | 1.44 | amorphous α-Fe | 3326 |
| 29 | 78.0 | 0.37 | 0.42 | 0.21 | 169 | 1.51 | amorphous | 1728 |
| 30 | 76.0 | 0.10 | 0.50 | 0.40 | 165 | 1.49 | amorphous α-Fe compound | 2956 |
| 31 | 79.0 | 0.40 | 0.10 | 0.50 | 161 | 1.42 | amorphous α-Fe compound | 3005 |
| 32 | 79.0 | 0.60 | 0.10 | 0.30 | 157 | 1.40 | amorphous α-Fe compound | 2830 |
| 33 | 79.0 | 0.20 | 0.30 | 0.50 | 165 | 1.47 | amorphous | 2095 |
| 34 | 79.0 | 0.40 | 0.30 | 0.30 | 171 | 1.52 | amorphous α-Fe | 2067 |
| 35 | 79.0 | 0.60 | 0.30 | 0.10 | 167 | 1.51 | amorphous α-Fe | 3169 |
| 36 | 79.0 | 0.20 | 0.50 | 0.30 | 175 | 1.57 | amorphous α-Fe | 3005 |
| 37 | 79.0 | 0.40 | 0.50 | 0.10 | 178 | 1.59 | amorphous α-Fe | 3081 |
| 38 | 79.0 | 0.20 | 0.70 | 0.10 | 176 | 1.60 | amorphous α-Fe compound | 3636 |
| 39 | 79.0 | 0.37 | 0.42 | 0.21 | 180 | 1.64 | amorphous α-Fe | 2410 |
| 40 | 79.0 | 0.70 | 0.20 | 0.10 | 176 | 1.60 | amorphous α-Fe compound | 3081 |
| 41 | 78.1 | 0.60 | 0.00 | 0.40 | 149 | 1.34 | amorphous α-Fe compound | 3044 |
| 42 | 79.0 | 0.70 | 0.00 | 0.30 | 150 | 1.36 | amorphous α-Fe | 3214 |

TABLE 3

| Sample No. | General formula: $Fe_a(Si_bB_cP_d)_{100-a}$ | | | | Saturation magnetization ($A \cdot m^2/kg$) | Saturation magnetic flux density (T) | Identified phase | Core loss ($kW/m^3$) |
|---|---|---|---|---|---|---|---|---|
| | a | b | c | d | | | | |
| 43 | 79.6 | 0.60 | 0.00 | 0.40 | 153 | 1.37 | amorphous α-Fe | 3150 |
| 44 | 79.0 | 0.10 | 0.30 | 0.60 | 165 | 1.49 | amorphous α-Fe | 2864 |
| 45 | 79.6 | 0.00 | 0.40 | 0.60 | 169 | 1.51 | amorphous α-Fe compound | 3472 |
| 46 | 79.1 | 0.20 | 0.75 | 0.05 | 179 | 1.58 | amorphous α-Fe compound | 3047 |
| 47 | 79.1 | 0.50 | 0.50 | 0.00 | 180 | 1.60 | amorphous α-Fe compound | 3098 |
| 48 | 79.6 | 0.78 | 0.11 | 0.11 | 175 | 1.59 | amorphous α-Fe compound | 3312 |
| 49 | 80.0 | 0.60 | 0.20 | 0.20 | 163 | 1.47 | amorphous α-Fe compound | 2999 |
| 50 | 80.0 | 0.27 | 0.20 | 0.53 | 168 | 1.51 | amorphous α-Fe | 3433 |
| 51 | 80.0 | 0.00 | 0.40 | 0.60 | 169 | 1.51 | amorphous α-Fe | 3401 |
| 52 | 80.0 | 0.37 | 0.42 | 0.21 | 177 | 1.62 | amorphous α-Fe | 3211 |
| 53 | 81.0 | 0.17 | 0.26 | 0.57 | 174 | 1.53 | amorphous α-Fe compound | 3583 |
| 54 | 81.0 | 0.27 | 0.20 | 0.53 | 181 | 1.66 | amorphous α-Fe | 3433 |
| 55 | 81.0 | 0.44 | 0.19 | 0.37 | 171 | 1.52 | amorphous α-Fe compound | 3504 |
| 56 | 81.0 | 0.38 | 0.26 | 0.36 | 174 | 1.54 | amorphous α-Fe | 3557 |
| 57 | 81.0 | 0.44 | 0.20 | 0.36 | 170 | 1.51 | amorphous α-Fe compound | 3588 |
| 58 | 81.0 | 0.20 | 0.18 | 0.62 | 168 | 1.49 | amorphous α-Fe | 3519 |

TABLE 4

| Sample No. | General formula: $Fe_a(Si_bB_cP_d)_{100-a}$ | | | | Saturation magnetization ($A \cdot m^2/kg$) | Saturation magnetic flux density (T) | Identified phase | Core loss ($kW/m^3$) |
|---|---|---|---|---|---|---|---|---|
| | a | b | c | d | | | | |
| 59 | 72.0 | 0.20 | 0.50 | 0.30 | 148 | 1.31 | amorphous α-Fe compound | 3337 |
| 60 | 72.0 | 0.40 | 0.50 | 0.10 | 156 | 1.39 | amorphous α-Fe | 3209 |
| 61 | 72.0 | 0.20 | 0.70 | 0.10 | 163 | 1.48 | amorphous α-Fe | 3065 |
| 62 | 76.0 | 0.10 | 0.70 | 0.20 | 165 | 1.49 | amorphous α-Fe | 1565 |
| 63 | 76.0 | 0.10 | 0.40 | 0.50 | 160 | 1.45 | amorphous α-Fe | 2354 |
| 64 | 76.0 | 0.30 | 0.15 | 0.55 | 151 | 1.36 | amorphous α-Fe compound | 2864 |
| 65* | 76.0 | 0.00 | 0.70 | 0.30 | 167 | 1.53 | amorphous α-Fe compound | 5495 |
| 66* | 76.0 | 0.00 | 0.50 | 0.50 | 166 | 1.51 | amorphous α-Fe compound | 5549 |
| 67* | 76.0 | 0.00 | 0.30 | 0.70 | 157 | 1.42 | α-Fe compound | 6837 |

TABLE 4-continued

| Sample No. | General formula: $Fe_a(Si_bB_cP_d)_{100-a}$ | | | | Saturation magnetization ($A \cdot m^2/kg$) | Saturation magnetic flux density (T) | Identified phase | Core loss ($kW/m^3$) |
|---|---|---|---|---|---|---|---|---|
| | a | b | c | d | | | | |
| 68* | 76.0 | 0.10 | 0.80 | 0.10 | 173 | 1.57 | amorphous α-Fe compound | 4021 |
| 69* | 76.0 | 0.20 | 0.10 | 0.70 | 154 | 1.37 | α-Fe compound | 9532 |
| 70* | 76.0 | 0.40 | 0.00 | 0.60 | 143 | 1.27 | α-Fe | 11543 |
| 71* | 76.0 | 0.60 | 0.00 | 0.40 | 139 | 1.24 | amorphous α-Fe | 6932 |
| 72* | 76.0 | 0.70 | 0.30 | 0.00 | 154 | 1.40 | α-Fe | 4070 |
| 73* | 76.0 | 0.70 | 0.10 | 0.20 | 146 | 1.30 | α-Fe | 4045 |
| 74* | 70.0 | 0.37 | 0.42 | 0.21 | 145 | 1.25 | amorphous α-Fe | 3910 |
| 75* | 81.0 | 0.37 | 0.42 | 0.21 | 178 | 1.64 | amorphous α-Fe | 3748 |
| 76* | 82.0 | 0.37 | 0.42 | 0.21 | 187 | 1.73 | amorphous α-Fe | 3975 |
| 77* | 76.0 | 0.00 | 0.90 | 0.10 | 169 | 1.57 | α-Fe compound | 4905 |

Mark "*" indicates a sample out of a scope of the present disclosure.

TABLE 5

| Sample No. | General formula: $Fe_a(Si_bB_cP_d)_{100-a}$ | | | | Saturation magnetization ($A \cdot m^2/kg$) | Saturation magnetic flux density (T) | Identified phase | Core loss ($kW/m^3$) |
|---|---|---|---|---|---|---|---|---|
| | a | b | c | d | | | | |
| 78* | 76.0 | 0.00 | 0.10 | 0.90 | 149 | 1.35 | α-Fe compound | 7719 |
| 79* | 76.0 | 0.10 | 0.90 | 0.00 | 169 | 1.54 | amorphous α-Fe compound | 4380 |
| 80* | 76.0 | 0.10 | 0.20 | 0.70 | 154 | 1.38 | amorphous α-Fe compound | 5991 |
| 81* | 76.0 | 0.20 | 0.80 | 0.00 | 169 | 1.57 | amorphous α-Fe | 4484 |
| 82* | 76.0 | 0.20 | 0.00 | 0.80 | 143 | 1.27 | α-Fe | 9474 |
| 83* | 76.0 | 0.40 | 0.10 | 0.50 | 149 | 1.32 | amorphous α-Fe compound | 4975 |
| 84* | 76.0 | 0.70 | 0.20 | 0.10 | 154 | 1.41 | α-Fe | 3732 |
| 85* | 79.0 | 0.00 | 0.10 | 0.90 | 155 | 1.38 | amorphous α-Fe compound | 8360 |
| 86* | 79.0 | 0.20 | 0.10 | 0.70 | 163 | 1.45 | amorphous α-Fe compound | 9673 |
| 87* | 79.0 | 0.00 | 0.30 | 0.70 | 167 | 1.50 | amorphous α-Fe compound | 4525 |
| 88* | 79.0 | 0.00 | 0.50 | 0.50 | 173 | 1.56 | amorphous α-Fe compound | 3975 |
| 89* | 79.0 | 0.00 | 0.70 | 0.30 | 181 | 1.64 | amorphous α-Fe compound | 5829 |
| 90* | 79.0 | 0.00 | 0.90 | 0.10 | 186 | 1.70 | amorphous α-Fe compound | 5553 |
| 91* | 72.0 | 0.20 | 0.10 | 0.70 | 136 | 1.20 | α-Fe compound | N.D. |
| 92* | 72.0 | 0.40 | 0.10 | 0.50 | 123 | 1.08 | α-Fe compound | N.D. |
| 93* | 72.0 | 0.60 | 0.10 | 0.30 | 123 | 1.09 | α-Fe compound | 9117 |
| 94* | 72.0 | 0.80 | 0.10 | 0.10 | 132 | 1.19 | α-Fe | N.D. |

Mark "*" indicates a sample out of a scope of the present disclosure.

TABLE 6

| Sample No. | General formula: $Fe_a(Si_bB_cP_d)_{100-a}$ | | | | Saturation magnetization ($A \cdot m^2/kg$) | Saturation magnetic flux density (T) | Identified phase | Core loss ($kW/m^3$) |
|---|---|---|---|---|---|---|---|---|
| | a | b | c | d | | | | |
| 95* | 72.0 | 0.00 | 0.30 | 0.70 | 147 | 1.30 | amorphous α-Fe compound | N.D. |
| 96* | 72.0 | 0.20 | 0.30 | 0.50 | 146 | 1.29 | amorphous α-Fe compound | N.D. |
| 97* | 72.0 | 0.40 | 0.30 | 0.30 | 145 | 1.28 | amorphous α-Fe compound | 4744 |
| 98* | 72.0 | 0.60 | 0.30 | 0.10 | 147 | 1.32 | amorphous α-Fe compound | 7724 |
| 99* | 72.0 | 0.00 | 0.50 | 0.50 | 156 | 1.39 | amorphous α-Fe compound | N.D. |
| 100* | 72.0 | 0.00 | 0.70 | 0.30 | 160 | 1.44 | amorphous α-Fe compound | 5289 |
| 101* | 72.0 | 0.00 | 0.90 | 0.10 | 173 | 1.56 | α-Fe compound | N.D. |
| 102* | 70.0 | 0.30 | 0.60 | 0.10 | 153 | 1.36 | amorphous α-Fe compound | 3985 |
| 103* | 70.0 | 0.15 | 0.50 | 0.35 | 143 | 1.27 | amorphous α-Fe compound | 4116 |
| 104* | 71.0 | 0.37 | 0.42 | 0.21 | 145 | 1.29 | amorphous α-Fe compound | 4483 |
| 105* | 71.0 | 0.35 | 0.40 | 0.25 | 144 | 1.28 | amorphous α-Fe compound | 4137 |
| 106* | 71.0 | 0.15 | 0.50 | 0.35 | 142 | 1.26 | amorphous α-Fe compound | 4304 |
| 107* | 71.0 | 0.10 | 0.80 | 0.10 | 159 | 1.43 | amorphous α-Fe compound | 4739 |
| 108* | 71.0 | 0.40 | 0.60 | 0.00 | 153 | 1.36 | amorphous α-Fe compound | 4294 |
| 109* | 72.0 | 0.40 | 0.60 | 0.00 | 160 | 1.44 | amorphous α-Fe compound | 4036 |

Mark "*" indicates a sample out of a scope of the present disclosure.

TABLE 7

| Sample No. | General formula: $Fe_a(Si_bB_cP_d)_{100-a}$ | | | | Saturation magnetization ($A \cdot m^2/kg$) | Saturation magnetic flux density (T) | Identified phase | Core loss ($kW/m^3$) |
|---|---|---|---|---|---|---|---|---|
| | a | b | c | d | | | | |
| 110* | 76.0 | 0.50 | 0.10 | 0.40 | 144 | 1.28 | amorphous α-Fe | 3970 |
| 111* | 76.0 | 0.60 | 0.10 | 0.30 | 141 | 1.25 | amorphous α-Fe compound | 3821 |
| 112* | 79.0 | 0.80 | 0.10 | 0.10 | 165 | 1.49 | α-Fe compound | 3708 |
| 113* | 79.0 | 0.10 | 0.20 | 0.70 | 156 | 1.40 | α-Fe compound | 4217 |
| 114* | 80.0 | 0.20 | 0.10 | 0.70 | 166 | 1.49 | amorphous α-Fe compound | N.D. |
| 115* | 80.0 | 0.90 | 0.00 | 0.10 | 157 | 1.40 | α-Fe | 3918 |
| 116* | 80.0 | 0.00 | 0.60 | 0.40 | 172 | 1.55 | α-Fe compound | 3945 |
| 117* | 81.0 | 0.60 | 0.30 | 0.10 | 174 | 1.57 | amorphous α-Fe compound | 4518 |

TABLE 7-continued

| Sample No. | General formula: $Fe_a(Si_bB_cP_d)_{100-a}$ | | | | Saturation magnetization ($A \cdot m^2/kg$) | Saturation magnetic flux density (T) | Identified phase | Core loss ($kW/m^3$) |
|---|---|---|---|---|---|---|---|---|
| | a | b | c | d | | | | |
| 118* | 81.0 | 0.10 | 0.40 | 0.50 | 176 | 1.59 | α-Fe compound | 4218 |
| 119* | 81.0 | 0.50 | 0.10 | 0.40 | 165 | 1.49 | amorphous α-Fe compound | 4106 |
| 120* | 81.0 | 0.20 | 0.10 | 0.70 | 170 | 1.53 | amorphous α-Fe compound | N.D. |
| 121* | 82.0 | 0.20 | 0.20 | 0.60 | 172 | 1.55 | α-Fe compound | N.D. |
| 122* | 81.0 | 0.60 | 0.20 | 0.20 | 167 | 1.51 | amorphous α-Fe compound | 4440 |
| 123* | 81.0 | 0.30 | 0.30 | 0.40 | 175 | 1.58 | amorphous α-Fe | 4451 |

Mark "*" indicates a sample out of a scope of the present disclosure.

Figure 14:
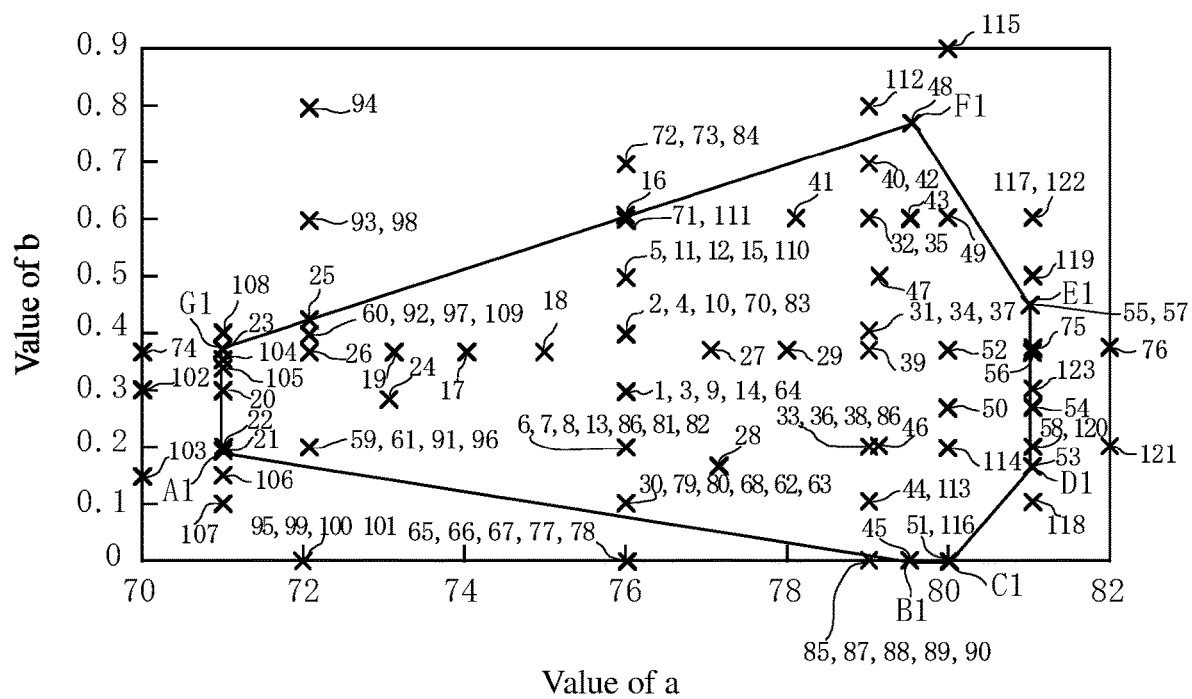
FIG. 14 is a view in which values of a and values of b of each of the samples in Example 1 are plotted.
Figure 15:
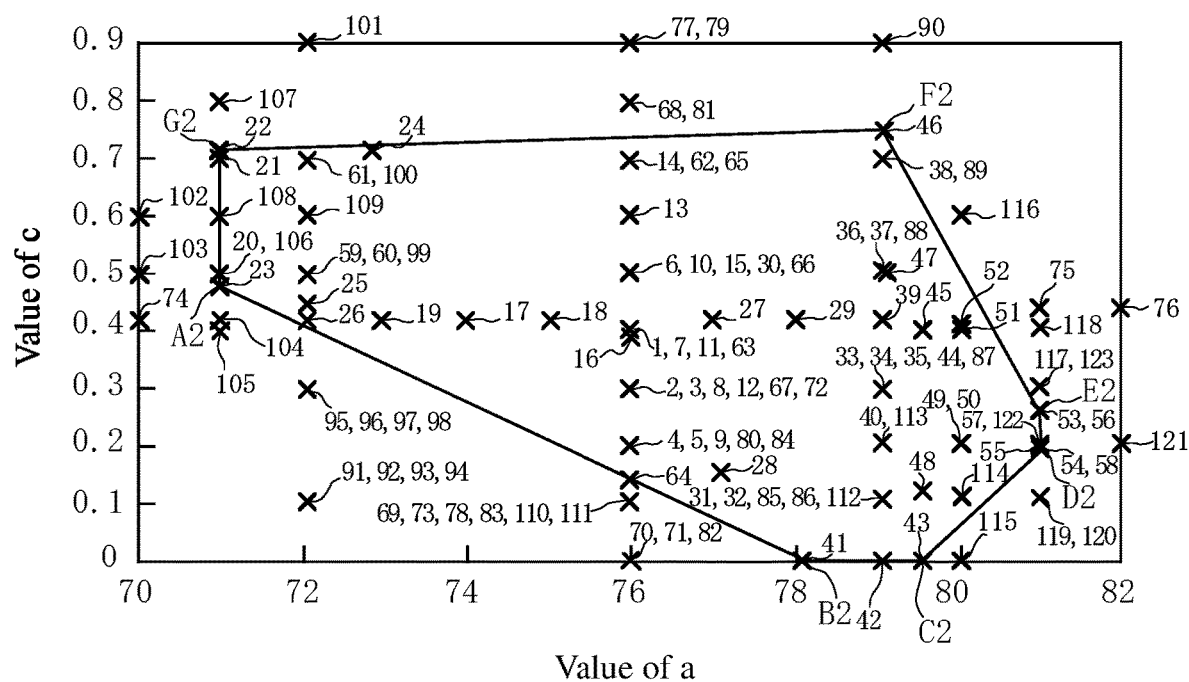
FIG. 15 is a view in which values of a and values of c of each of the samples in Example 1 are plotted.
Figure 16:
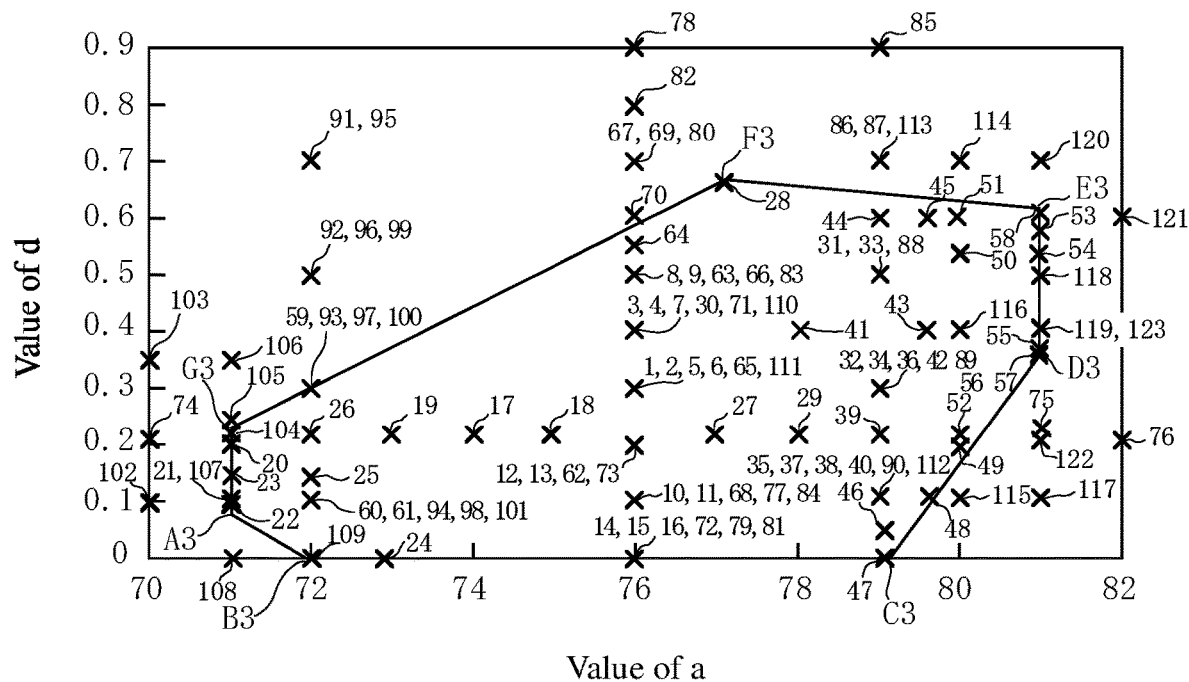
FIG. 16 is a view in which values of a and values of d of each of the samples in Example 1 are plotted.

FIG. 14 is a view in which values of a and values of b of each of the samples are plotted, FIG. 15 is a view in which values of a and values of c of each of the samples are plotted, and FIG. 16 is a view in which values of a and values of d of each of the samples are plotted. In FIGS. 14 to 16, a horizontal axis represents the value of a and a vertical axis represents the value of b, the value of c or the value of d.

As is apparent from Tables 1 to 7 and FIGS. 14 to 16, it was found that all of sample Nos. 1 to 64 were within the region surrounded by A1 to G1, A2 to G2, and A3 to G3 and within the scope of the present disclosure, and therefore it is possible to obtain good magnetic characteristics of high saturation magnetic flux density of 1.30 T or more and low core loss of 3600 $kW/m^3$ or less.

On the contrary, it was found that in sample Nos. 65 to 123, at least one of (a, b), (a, c) and (a, d) was positioned outside the region described above and outside the scope of the present disclosure, and therefore the saturation magnetic flux density was lowered less than 1.30 T and the core loss increased over 3600 $kW/m^3$.

Table 8 shows the crystallinity X of sample Nos. 2, 34, 52, 61, 65, 75, 76, 84, 98, and 99. In addition, in Table 8, a mark "*" indicates a sample out of the scope of the present disclosure.

TABLE 8

| Sample No. | General formula: $Fe_a(Si_bB_cP_d)_{100-a}$ | | | | Crystallinity (%) |
|---|---|---|---|---|---|
| | a | b | c | d | |
| 2 | 76.0 | 0.40 | 0.30 | 0.30 | 0 |
| 34 | 79.0 | 0.40 | 0.30 | 0.30 | 4.4 |
| 52 | 80.0 | 0.37 | 0.42 | 0.21 | 29.4 |
| 61 | 72.0 | 0.20 | 0.70 | 0.10 | 26.4 |
| 65* | 76.0 | 0.00 | 0.70 | 0.30 | 52.5 |
| 75* | 81.0 | 0.37 | 0.42 | 0.21 | 51.4 |
| 76* | 82.0 | 0.37 | 0.42 | 0.21 | 58.3 |
| 84* | 76.0 | 0.70 | 0.20 | 0.10 | 87.2 |
| 98* | 72.0 | 0.60 | 0.30 | 0.10 | 34.4 |
| 99* | 72.0 | 0.00 | 0.50 | 0.5 | 32.7 |

Mark "*" indicates a sample out of a scope of the present disclosure.

As is apparent from Table 8, it was found that sample Nos. 65, 75, 76, 84, 98 and 99 out of the scope of the present disclosure have the crystallinity X more than 30%.

On the other hand, it was verified that sample Nos. 2, 34, 52 and 61 within the scope of the present disclosure have the crystallinity X of 30% or less.

With respect to other sample numbers, it was verified that the samples within the scope of the present disclosure have the crystallinity X of 30% or less and the samples out of the scope of the present disclosure have the crystallinity X more than 30%.

From the above description, it was found that when the composition range satisfies the region surrounded by A1 to G1, A2 to G2, and A3 to G3 in FIGS. 14 to 16, the crystallinity X is 30% or less, and therefore it is possible to obtain a magnetic powder having high saturation magnetic flux density of 1.30 T or more and low core loss of 3600 $kW/m^3$ or less even though a powder structure includes not only a single-phase of an amorphous phase but also a crystalline phase.

Example 2

Sample Nos. 200 to 210 were prepared by the same method/procedure as in Example 1 except that Co and Ni were prepared as base materials in addition to Fe, Si, B and $Fe_3P$, and these materials were mixed so that in the general formula $Fe_{a-e}M_a(Si_bB_cP_d)_{100-a}$ (M is Co and/or Ni), a, b, c, d and e were atomic composition ratios shown in Table 9.

Then, the saturation magnetization and the saturation magnetic flux density were determined by the same method/procedure as in Example 1 to identify a powder structure of each sample, and a core loss of each sample was measured.

Table 9 shows component composition of the sample Nos. 200 to 210 and measured results thereof.

TABLE 9

| Sample No. | General formula: $Fe_{a-e}M_e(Si_bB_cP_d)_{100-a}$ | | | | | Saturation magnetization ($A \cdot m^2/kg$) | Saturation magnetic flux density (T) | Identified phase | Core loss ($kW/m^3$) |
|---|---|---|---|---|---|---|---|---|---|
| | M | a | b | c | d | e | | | |
| 200 | — | 76.0 | 0.38 | 0.42 | 0.21 | 0.0 | 165 | 1.47 | amorphous | 1567 |
| 201 | Co | 76.0 | 0.38 | 0.42 | 0.21 | 3.0 | 167 | 1.49 | amorphous | 2814 |
| 202 | Co | 76.0 | 0.38 | 0.42 | 0.21 | 6.0 | 163 | 1.45 | amorphous | 2912 |
| 203 | Co | 76.0 | 0.38 | 0.42 | 0.21 | 9.0 | 163 | 1.46 | amorphous | 2543 |
| 204 | Co | 76.0 | 0.38 | 0.42 | 0.21 | 10.0 | 162 | 1.45 | amorphous | 2728 |
| 205 | Ni | 76.0 | 0.38 | 0.42 | 0.21 | 3.0 | 164 | 1.47 | amorphous | 2760 |
| 206 | Ni | 76.0 | 0.38 | 0.42 | 0.21 | 6.0 | 159 | 1.42 | amorphous | 2483 |
| 207 | Ni | 76.0 | 0.38 | 0.42 | 0.21 | 9.0 | 146 | 1.31 | amorphous | 2790 |
| 208 | Ni | 76.0 | 0.38 | 0.42 | 0.21 | 12.0 | 147 | 1.33 | amorphous | 3137 |
| 209 | Co, Ni | 76.0 | 0.38 | 0.42 | 0.21 | 6.0 | 163 | 1.46 | amorphous | 2956 |
| 210 | Co, Ni | 76.0 | 0.38 | 0.42 | 0.21 | 12.0 | 152 | 1.37 | amorphous | 2528 |

As is apparent from Table 9, it was verified that the magnetic powder having high saturation magnetic flux density and low magnetic loss is obtained even when a portion of Fe is substituted with Co and/or Ni if the substitution is performed within a range of 12 at % or less.

Example 3

Sample Nos. 300 to 304 were prepared by the same method/procedure as in Example 1 except that C was prepared as a base material in addition to Fe, Si, B and Fe$_3$P, and these materials were mixed so that in the general formula $Fe_a\{Si_b(B_{1-\alpha}C_\alpha)_cP_d\}_{100-a}$, a, b, c, d and α were atomic composition ratios shown in Table 10.

Then, the saturation magnetization and the saturation magnetic flux density were determined by the same method/procedure as in Example 1 to identify a powder structure of each sample, and a core loss of each sample was measured.

Table 10 shows component composition of samples Nos. 300 to 304 and measured results thereof.

TABLE 10

| Sample No. | General formula: $Fe_a\{Si_b(B_{1-\alpha}C_\alpha)_cP_d\}_{100-a}$ | | | | | Saturation magnetization ($A \cdot m^2/kg$) | Saturation magnetic flux density (T) | Identified phase | Core loss ($kW/m^3$) |
|---|---|---|---|---|---|---|---|---|---|
| | a | b | c | d | α | | | | |
| 300 | 76.0 | 0.38 | 0.42 | 0.20 | 0 | 165 | 1.47 | amorphous | 1567 |
| 301 | 76.0 | 0.38 | 0.42 | 0.20 | 0.19 | 163 | 1.45 | amorphous | 1711 |
| 302 | 76.0 | 0.38 | 0.42 | 0.20 | 0.405 | 164 | 1.47 | amorphous | 1752 |
| 303 | 76.0 | 0.38 | 0.42 | 0.20 | 0.595 | 159 | 1.43 | amorphous | 1624 |
| 304 | 76.0 | 0.38 | 0.42 | 0.20 | 0.81 | 165 | 1.49 | amorphous compound | 2278 |

As is apparent from Table 10, it was found that a magnetic powder having high saturation magnetic flux density and lower core loss is obtained even when a portion of B is substituted with C if the substitution is performed within a range of 85 at % or less.

INDUSTRIAL APPLICABILITY

It is possible to realize a soft magnetic powder of high quality having high saturation magnetic flux density and low magnetic loss, and a magnetic core, a coil component such as an inductor and a motor which respectively use the magnetic powder.

The invention claimed is:

1. A magnetic powder comprising
   a principal component represented by a general formula $Fe_{a-e}M_e(Si_b(B_{1-\alpha}C_\alpha)_cP_d)_{100-a}$,
   wherein M is one or more selected from the group consisting of Ni and Co, e is 0 to 12.0, α is 0, and b+c+d=1.00,
   when representing as (a, b) the a and the b, (a, b) is within a region surrounded by A1 (71.0, 0.19), B1 (79.6, 0), C1 (80.0, 0), D1 (81.0, 0.17), E1 (81.0, 0.44), F1 (79.6, 0.78) and G1 (71.0, 0.38),
   when representing as (a, c) the a and the c, (a, c) is within a region surrounded by A2 (71.0, 0.48), B2 (78.1, 0), C2 (79.6, 0), D2 (81.0, 0.18), E2 (81.0, 0.26), F2 (79.1, 0.75) and G2 (71.0, 0.72), and
   when representing as (a, d) the a and the d, (a, d) is within a region surrounded by A3 (71.0, 0.08), B3 (71.9, 0), C3 (79.1, 0), D3 (81.0, 0.36), E3 (81.0, 0.62), F3 (77.2, 0.67) and G3 (71.0, 0.23).

2. The magnetic powder according to claim 1, wherein e=0.

3. The magnetic powder according to claim 2, wherein the a is 77.0 to 81.0, the b is 0.1 to 0.78, the c is 0 to 0.75, and the d is 0.05 to 0.67.

4. The magnetic powder according to claim 2, wherein the c is 0 to 0.30.

5. The magnetic powder according to claim 1, wherein crystallinity measured by an X-ray diffraction method is at least 0% and not more than 30%.

6. The magnetic powder according to claim 1, wherein saturation magnetic flux density is not less than 1.30 T.

7. A magnetic core, wherein a principal component is formed of the magnetic powder according to claim 1.

8. The magnetic core according to claim 7, wherein the magnetic core contains a binder, and the content of the magnetic powder is not less than 60 vol % in terms of volume ratio.

9. A coil component in which a coil conductor is wound around a core part,
wherein the core part is formed of the magnetic core according to claim 7.

10. A coil component in which a coil conductor is buried in a magnetic part,
wherein a principal component of the magnetic part is formed of the magnetic powder according to claim 1.

11. The coil component according to claim 10, wherein the magnetic part contains a binder, and
the content of the magnetic powder in the magnetic part is not less than 60 vol % in terms of volume ratio.

12. A motor comprising
a stator core in which a plurality of armature teeth are spaced at regular intervals on the same circumference;
a coil conductor wound around the armature teeth; and
a rotor core arranged rotatably inside the stator core,
wherein the principal component of at least one of the stator core and the rotor core is formed of the magnetic powder according to claim 1.

13. The magnetic powder according to claim 1, wherein the a is 77.0 to 81.0, the b is 0.1 to 0.78, the c is 0 to 0.75, and the d is 0.05 to 0.67.

14. The magnetic powder according to claim 1, wherein the c is 0 to 0.30.

15. The magnetic powder according to claim 1, wherein the magnetic powder is produced with a gas atomization method.

16. A magnetic powder consisting essentially of: a principal component represented by a general formula $Fe_{a-e}M_e(Si_b(B_{1-\alpha}C_\alpha)_c P_d)_{100-a}$, in which M is one or more selected from the group consisting of Ni and Co, e is 0 to 12.0, α is 0, and b+c +d=1.00,
when representing as (a, b) the a and the b, (a, b) is within a region surrounded by A1 (71.0, 0.19), B1 (79.6, 0), C1 (80.0, 0), D1 (81.0, 0.17), E1 (81.0, 0.44), F1 (79.6, 0.78) and G1 (71.0, 0.38),
when representing as (a, c) the a and the c, (a, c) is within a region surrounded by A2 (71.0, 0.48), B2 (78.1, 0), C2 (79.6, 0), D2 (81.0, 0.18), E2 (81.0, 0.26), F2 (79.1, 0.75) and G2 (71.0, 0.72), and
when representing as (a, d) the a and the d, (a, d) is within a region surrounded by A3 (71.0, 0.08), B3 (71.9, 0), C3 (79.1, 0), D3 (81.0, 0.36), E3 (81.0, 0.62), F3 (77.2, 0.67) and G3 (71.0, 0.23).

17. The magnetic powder according to claim 16, wherein a is 77.0 to 81.0, b is 0.1 to 0.78, c is 0 to 0.30, d is 0.05 to 0.67, and e is 0.

* * * * *